United States Patent [19]
Marotzke

[11] Patent Number: 5,690,358
[45] Date of Patent: Nov. 25, 1997

[54] AIRBAG, PROCESS FOR FOLDING SAME, AND APPARATUS FOR CARRYING OUT THE FOLDING PROCESS

[75] Inventor: Thomas Marotzke, Berlin, Germany

[73] Assignee: Petri AG, Aschaffenburg, Germany

[21] Appl. No.: 261,992

[22] Filed: Jun. 17, 1994

[30] Foreign Application Priority Data

Jun. 17, 1993 [DE] Germany ............... 43 20 610.7

[51] Int. Cl.⁶ .................................................. B60R 21/16
[52] U.S. Cl. ................................ 280/743.1; 280/728.1
[58] Field of Search ................ 280/728.1, 743.1; 493/916, 405

[56] References Cited

U.S. PATENT DOCUMENTS

| | | | |
|---|---|---|---|
| 2,524,770 | 5/1950 | Conery | 137/211 |
| 3,843,152 | 10/1974 | Nonaka | 280/731 |
| 3,876,272 | 4/1975 | Tsutsumi et al. | 339/3 S |
| 3,907,330 | 9/1975 | Kondo et al. | 280/150 AB |
| 4,173,356 | 11/1979 | Ross | 280/728.2 |
| 4,235,453 | 11/1980 | Lawson et al. | 280/728.2 |
| 4,351,544 | 9/1982 | Ross | 280/743.1 |
| 5,022,676 | 6/1991 | Rogerson et al. | 280/743 |
| 5,114,180 | 5/1992 | Kami et al. | 280/743.1 |
| 5,178,407 | 1/1993 | Kelley | 280/728.1 |
| 5,482,317 | 1/1996 | Nelson et al. | 280/728.1 |

FOREIGN PATENT DOCUMENTS

| | | | |
|---|---|---|---|
| 2279442 | 11/1990 | Japan | 280/743.1 |
| 2192841 | 1/1988 | United Kingdom . | |

OTHER PUBLICATIONS

"Airbags Are Everywhere—How Do They Stand Today?", International Akzo Symposium on Occupant Restraint Systems, Mar. 25-27, 1992, pp. 87-96.
PAM–SAFE; Seminar Notes by Engineering Systems International; 8 pages, Jul. 1990.

*Primary Examiner*—Paul N. Dickson
*Attorney, Agent, or Firm*—Christie, Parker & Hale, LLP

[57] ABSTRACT

An airbag, a process for folding same and an apparatus for carrying out the folding process are disclosed. In order to produce a folded airbag as well as a process and apparatus for manufacturing same which ensure that the airbag can unfold very quickly without obstruction evenly where possible in all directions when the associated gas generator is activated, the airbag has main fold lines which run at least in part along closed tracks around an imaginary center on the substantially empty spread-out airbag. The corresponding process ensures such a path of the main fold lines and the apparatus according to the invention has folding elements which are movable relative to each other and which have projections directed towards each other in the direction of movement wherein each projection or group of projections defines a closed track running round a center wherein tracks extending from inside to outside are provided at increasing distance from the center.

18 Claims, 24 Drawing Sheets

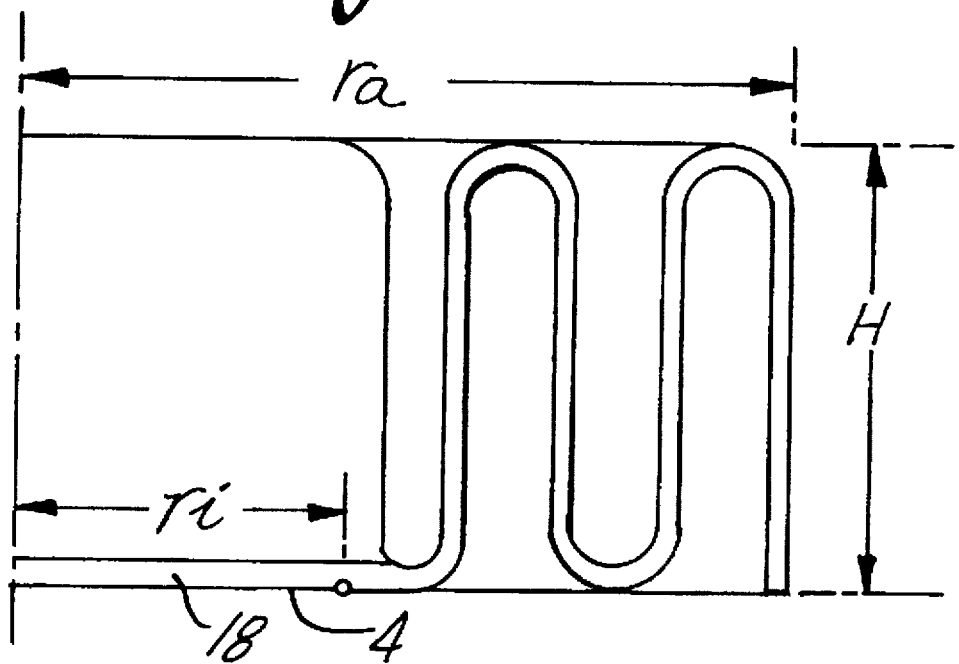

CIRCLE

TRIANGLE

POLYGON

RINGSEGMENT

STAR

MEANDER SHAPE

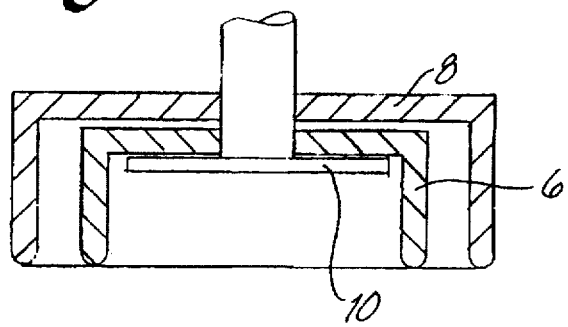
Fig.16
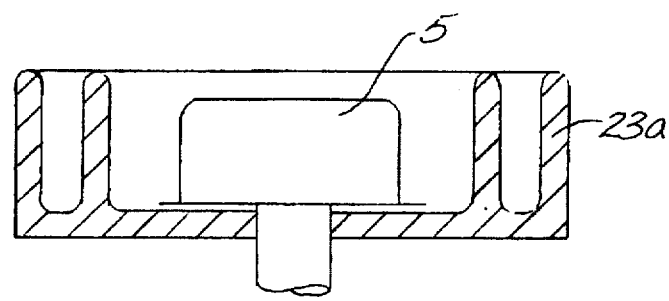
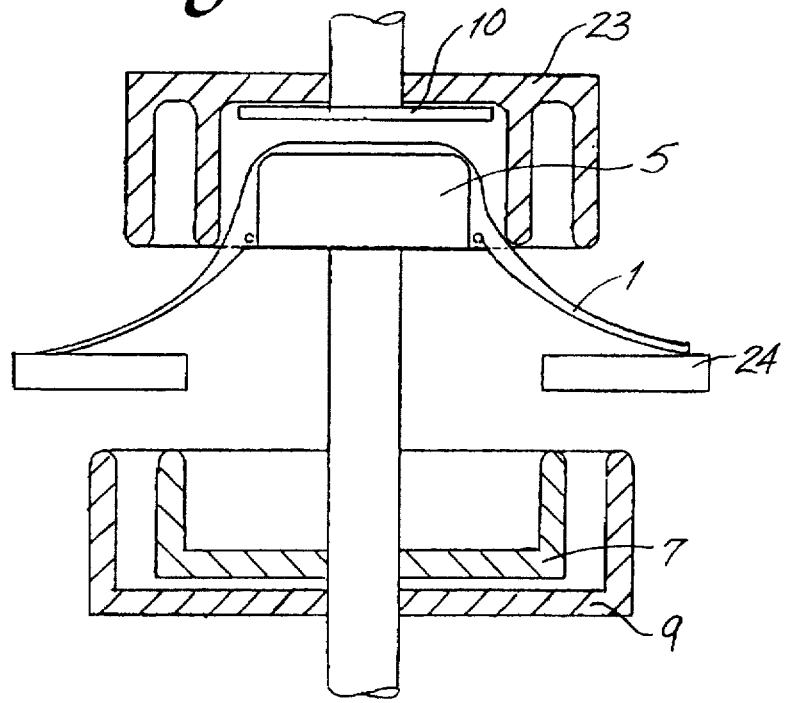
Fig.17

DIRECTION OF VEHICLE TRAVEL

AIRBAG, PROCESS FOR FOLDING SAME, AND APPARATUS FOR CARRYING OUT THE FOLDING PROCESS

BACKGROUND OF THE INVENTION

The present invention relates to airbags and to a process and apparatus for folding the airbags into airbag modules. By airbag module is generally meant an airbag folded down into a desired format together with a gas generator which is in a position after its release to fill the airbag with gas within fractions of a second. Airbag modules of this kind are stored, for example, in the center of the steering wheel or in the dashboard of motor vehicles without their use being restricted to these areas.

In order to offer adequate security in the event of an accident, an airbag must have a certain minimum size and must also be made from a sufficiently strong material. At the same time, however, the space available, particularly in the steering wheel center of a vehicle, is extremely tight and also restricted by a range of geometric marginal conditions since the steering wheel, apart from its connection with the steering column or shaft, also houses various other control elements, and in addition there must be sufficient space to view the dashboard through the openings between the steering wheel spokes.

It is obvious that owing to the different geometrical shapes of steering wheels in vehicles of different manufacturers, both the overall volume available and also the shape of the storage chamber for the airbag can be quite different. It is thus a question of folding the bag and wrapping it around the gas generator so that when the gas generator is released the airbag easily unfolds and can be rapidly and unrestrictedly filled with the gas. With the normal airbags it is customary to use the so-called "Leporello-folding" technique. Here the spread-out airbag is placed concertina-like in folds, starting from a central (imaginary) line either side of this line so that an oblong somewhat rectangular strip is formed which corresponds to the two halves of the airbag which have been folded up like a concertina. This strip is then repeatedly folded again in its longitudinal direction, wherein a difference is made for example between the types of folding, e.g., "pocket folding," "rolled folding" and "layer folding." The Leporello folding and also the other aforesaid types of folding are known for example from Nash, Carl E., NHTSA, Washington D.C., U.S.A., "Airbags Everywhere—How do They Stand Today?" and International Akzo Symposium on Occupant Restraint Systems, Mar. 25–27, 1992 (see also PAM-SAFE Seminar Notes, ESI (Engineering Systems International) July 1990) and from U.S. Pat. No. 2,524,770.

It is also known from U.S. Pat. Nos. 4,173,356, 4,235,453 and 4,351,544 to fold airbags along radial fold lines. U.S. Pat. No. 4,235,453 describes folding the airbag, after the radial folding, once again transversely to the radial fold lines.

The disadvantage of the known folding systems, however, is that with the gas pressure which arises in the center of the airbag when the gas generator is activated, the outer folds placed through the cross-folding, restrict the unfolding of the longitudinal folds and that initially the cross-folds which have been turned in last and which, particularly in the outer areas, at first have only been slightly reached by the gas pressure occurring in the center, must unfold first before unfolding can take place of the longitudinal folds which were first folded when the airbag was folded up.

This places great demands on the gas generator and also on the material of the airbag, which under certain circumstances is exposed during unfolding to substantially higher local material stresses than occur with the impact of an occupant on the filled airbag in the event of an accident.

Furthermore the known folding techniques have the disadvantage that folding must still be carried out at least in part by hand and that the folding process is very difficult to make automated.

These disadvantages also exist in airbags with radial fold lines.

In the known kinds of folding, there is also the disadvantage that the surface of the airbag, as it unfolds, has to turn repeatedly back and forth.

SUMMARY OF THE INVENTION

An object of the present invention is to provide a folded airbag as well as a process and apparatus for manufacturing same which ensure that when the associated gas generator is released the airbag can unfold very quickly, without obstruction, and where possible also evenly in all directions. Furthermore, folding of the bag should proceed substantially automatically.

With regard to the airbag itself, the object of the invention is achieved in that it has main fold lines which run at least for one part along closed tracks round an imaginary center on the substantially empty spread-out airbag.

The process according to the invention solves the problem in that in a first step folding of the flat spread-out airbag is carried out at least in one part along closed main fold lines running round an imaginary center wherein the airbag which has been pre-folded in this way is then brought to the desired end shape over secondary fold lines which cross at least in part the main fold lines.

The airbag can consist of an essentially gas-tight, flexible material with one inflation opening or a plurality of inflation openings. However, the invention can also be employed in connection with airbags without inflation openings, wherein a gas generator is provided in the interior of the airbag. In general, these are identified as self-supporting airbags.

In addition, the invention can be used for airbags made of an air-permeable fabric. With these, the air escapes through the fabric after inflation in case of a crash. Thus, separate deflation openings may not be necessary for the last mentioned airbags.

The corresponding apparatus is designed according to the invention so that it has folding elements which can move relative to each other and which have projections directed towards each other in the direction of movement wherein each projection or each group of projections define(s) a closed track running round the center wherein tracks are provided from inside to outside at increasing distance from the center.

The main fold lines preferably follow each other at approximately equal distances extending from the center radially outward. The folding direction should moreover change each time at the successive fold lines. Thus starting from an imaginary center of the spread-out airbag a type of concentric zig-zag or concertina folding is produced. In a preferred embodiment, although not absolutely essential, the successive main fold lines form concentric circles. The main fold lines can also run more or less elliptically or can also define a more or less rectangular shape with rounded corners. With an elliptical course the main fold lines preferably describe ellipses of low eccentricity, i.e. with a ratio of main axis to secondary axis having a maximum of 2.

The shape of the main fold lines is preferably adapted to the outer contour of the spread-out airbag. If the airbag has a more or less circular shape then the main fold lines form substantially concentric circles. The airbag can however also be roughly rectangular with rounded corners, so that the main fold lines are accordingly concentric rectangles with preferably rounded corners wherein the distances between each adjoining main fold line defining the rectangle are in each case substantially the same with a constant fold height. It is evident that the fold heights can be varied in any way from inward to outward in order to obtain shapes of corresponding variable cross-section for the folded airbags. The main fold lines can also be adapted to other outline shapes such as kidney shape and even deviations of the path of the main fold lines from the external contour of the spread-out airbag are obviously possible. In the latter case it is then generally assumed that the main fold lines lying furthest from the center no longer define closed tracks but end at the edge of the spread-out airbag.

The radius of curvature of the main fold line should preferably vary by less than a factor of 10. The smallest radius of curvature of a main fold line should amount at least to 10 mm. and preferably at least 30 mm.

The airbag is preferably spread out before folding so that its inflation opening lies approximately in the area of the center of the surface defined by the spread-out airbag and thus also forms the center around which run the main fold lines.

With the process according to the invention, a design is preferred wherein a socket part, preferably in the form of a cylindrical pot, is inserted in the inflation opening of the airbag and this opening, as already mentioned, defines the center of the spread-out airbag. The side of the airbag opposite the inflation opening is then pressed onto the pot-like socket part and is secured. Projections which lie concentric with but at different distances from the center, fold the airbag concertina-like alternately from one side and then from the other concentric with the socket part and inflation opening. Since the outer areas of the airbag are thereby gathered up stepwise inward, secondary folds are formed simultaneously which run in the radial direction and cross the main fold lines.

The alternate folding is preferably carried out from opposite sides concentrically round the socket part by means of interfitting dish-like elements with preferably cylindrical walls, namely from opposite sides wherein obviously the diameter of the opposing dish-like elements are different so that with the exception of the dish-like element lying furthest inward, each of the dish-like elements engages over that with the next smallest diameter which is mounted each time on the opposite side so that the intermediate airbag is placed round and folded each time over the edge of the opposite dish-like element. It can thereby be advantageous and expedient if the airbag is consciously made to form secondary folds at certain positions, for example by making waves in the edges of corresponding folding elements or providing projections and/or restrictions through which the secondary folds can be arranged at certain positions and preferably spread out evenly along the circumferential main fold lines.

It is preferable if these projections or opposing dish-like elements come into action alternately, namely beginning with the element furthest inward, wherein if required a pair of such elements can be set in motion simultaneously from opposite sides. The dish-like elements then finally form a sequence of dishes of preferably cylindrical cross-section, but in principle of any cross-section, fitting inside each other alternately with their open sides so that the airbag runs zig-zag or concertina-like in cross-section between the free spaces remaining between the walls of the dishes, starting from the center in any radial direction (i.e., perpendicular to the axis of the inflation opening).

The interengaging dishes are then drawn apart. Additional stripper elements can ensure that the airbag folds are not drawn out at the same time with the dishes.

After the dishes have moved away in the axial direction, the airbag pre-folded in this way can be compressed in the radial direction, more in one direction and less in the other, if required, until it has assumed the desired shape. In the simplest case, for example, two pairs of radial folding elements can each compress the pre-folded airbag from opposite sides in the direction of the pot-like socket element and thus press the airbag concentrically against the socket element. The socket element is then also removed from the inflation opening and the airbag removed from same and can then be replaced for example by a gas generator or the like. An airbag parcel is then obtained which is folded concentrically in a circular disc-like way round a preferably substantially cylindrical gas generator. This concentric concertina folding then ensures that when the gas generator releases gas the airbag is inflated evenly and radially in all directions and unfolds from inside without the outer folds impeding this unfolding process. The inflation is thus carried out very evenly, rapidly, and without excessively straining the airbag material.

It is evident that the dish-like preferably cylindrical or pot-shaped projections need not necessarily form closed dishes but can also be formed from individual separate segments which overall define with their edges facing the airbag points or sections of a substantially closed track. The closed tracks can also be formed for example by a row or border of individual projecting fingers.

The interengaging dishes of the folding elements, moreover, do not necessarily have to be movable individually on both sides of the airbag. Thus, for example, it is possible to connect, either on the underneath or on the top side, a group of dishes into a folding matrix which consists of several more or less concentric interconnected dishes or rings which are fixed on a common base. The folding elements or dishes on the opposite side should then be individually movable and project between two adjoining rings or dish edges of the folding matrix, again beginning from inside, so that the airbag is drawn or pressed by the folding elements projecting into the matrix into each interspace between two adjoining rings or dishes.

BRIEF DESCRIPTION OF THE DRAWINGS

Further advantages, features and uses of the present invention will be clearly apparent from the following description of a preferred embodiment with reference to the associated drawings in which:

FIG. 7 is a further sectional view through a pre-folded airbag;

FIG. 8, subdivided into

FIG. 9, subdivided into

FIG. 12 shows an airbag of circular contour with the main and secondary fold lines marked in;

FIG. 14 shows an airbag with a substantially rectangular contour with the main and secondary fold lines marked in;

FIG. 16 shows folding elements which consist on the underneath of a rigid matrix of fixedly connected dishes;

FIG. 17 shows folding elements wherein the upper part consists of a rigid matrix.

DETAILED DESCRIPTION OF THE PREFERRED EMBODIMENTS

Figure 1:
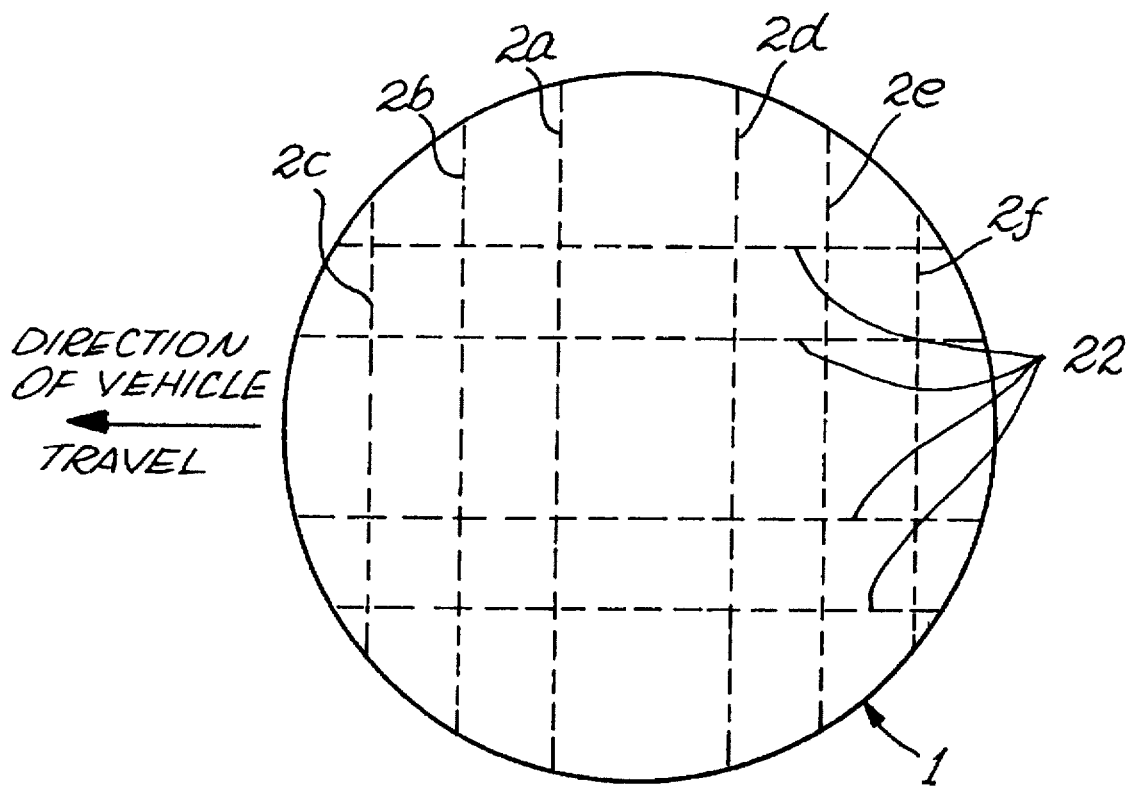
FIG. 1 shows the main and secondary fold lines of a conventional airbag.

FIG. 1 shows the fold lines of a conventional airbag 1. Thus for example in a first folding step the part lying on the left next to the line 2a is folded round the fold line 2a onto the part lying on the right thereof. The part lying on the other side of the line 2b is then folded back again and finally the part lying on the other side of the line 2c is again folded round in the same way as the entire left part was previously folded round the line 2a. An overall four-layered packet of airbag folds formed in concertina fashion then lies between the center point or the vertical center line in FIG. 1 and the fold line 2a.

The process is then repeated mirror-symmetrically with regard to lines 2d, 2e and 2f so that finally two concertina-folded packets of airbag layers or folds lie opposite one another either side of the vertical center line. These are then folded again crosswise round secondary fold lines 22 wherein the folding action here can be carried out concertina-fashion or according to other known processes. The packet thus obtained can then be stowed away, for example, in the center of the steering wheel of a motor vehicle together with a gas generator which is attached to the socket opening (not shown) of the airbag.

Figure 2:
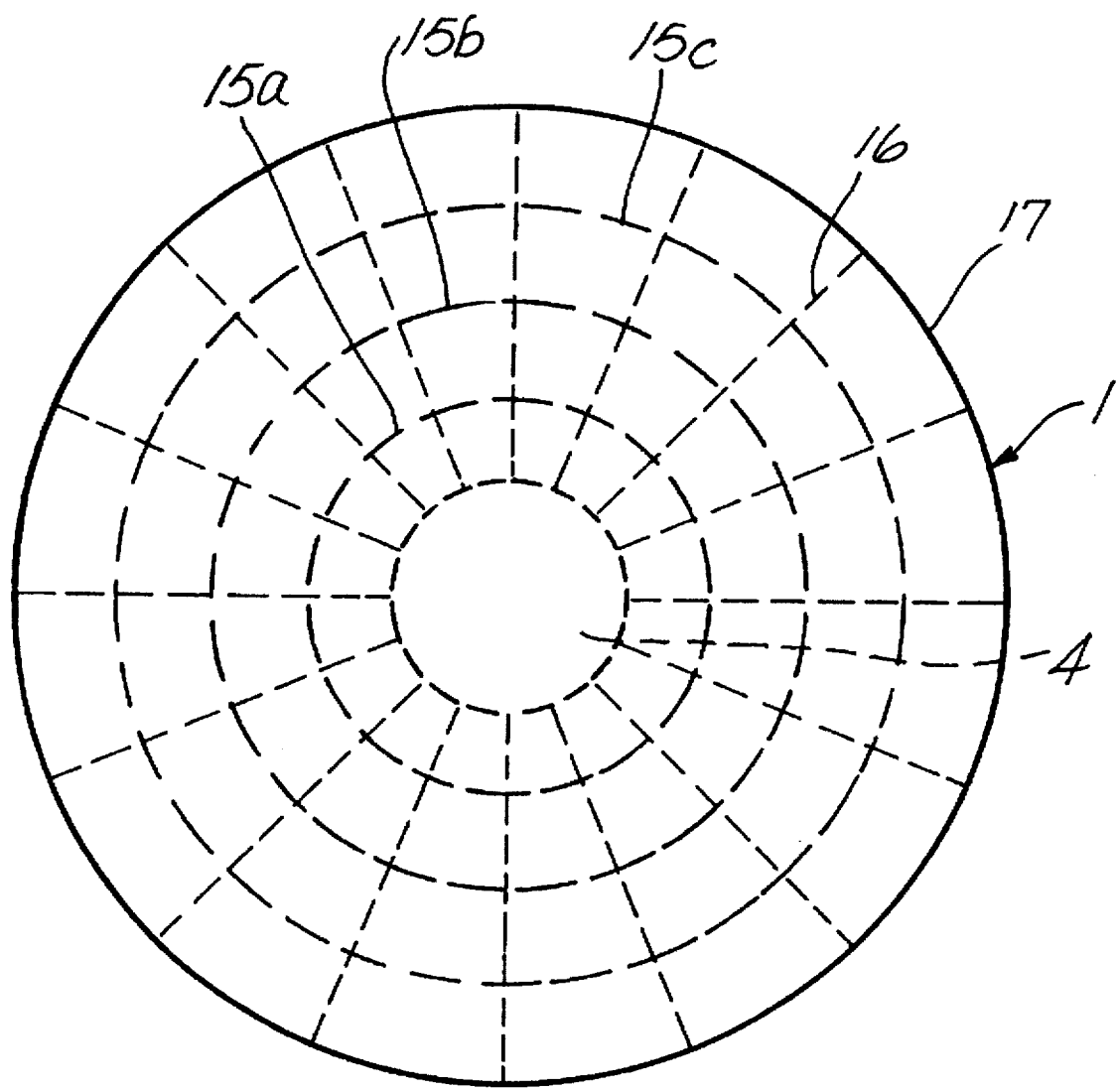
FIG. 2 shows the main and secondary fold lines of the airbag according to the invention.
Figure 3:
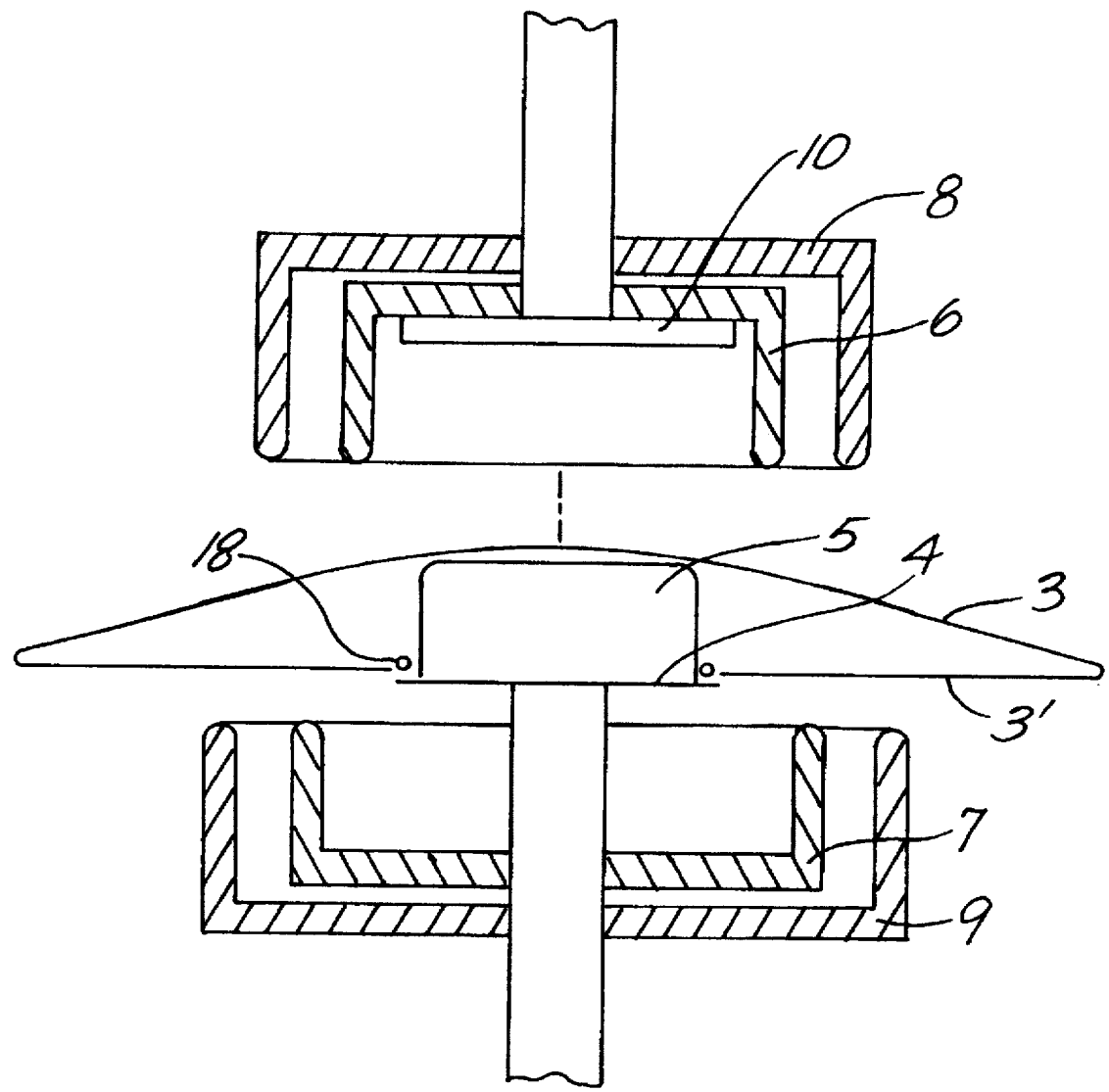
FIG. 3 shows a section along a plane containing the axis of an apparatus for folding an airbag according to the invention.

Compared with this, FIG. 2 shows an airbag 1 with the same circular contour wherein, however, the main fold lines 15 run parallel to the contour line 17 and concentrically with each other and thus around an imaginary point in the airbag. The socket opening 4 which is provided for example on the underneath of the spread-out airbag is indicated by the dotted line in the center of the airbag 1. Folding the airbag is carried out concertina-fashion from inside to outside round the folding lines 15a to 15c. An apparatus shown diagrammatically in section in FIG. 3 is used to carry out this folding process. FIG. 3 shows a substantially flat spread-out airbag 1 with an upper side 3 and a lower side 3'. The lower side 3' contains the socket opening 4 which is arranged approximately central in this spread-out state and which is used to fit the airbag 1 onto a pot-like cylindrical socket element 5. This cylindrical pot then projects into the inside of the airbag 1 and forms an abutment for both a counter holder 10 and for the folding elements 6, 7, 8 and 9.

Figure 4:
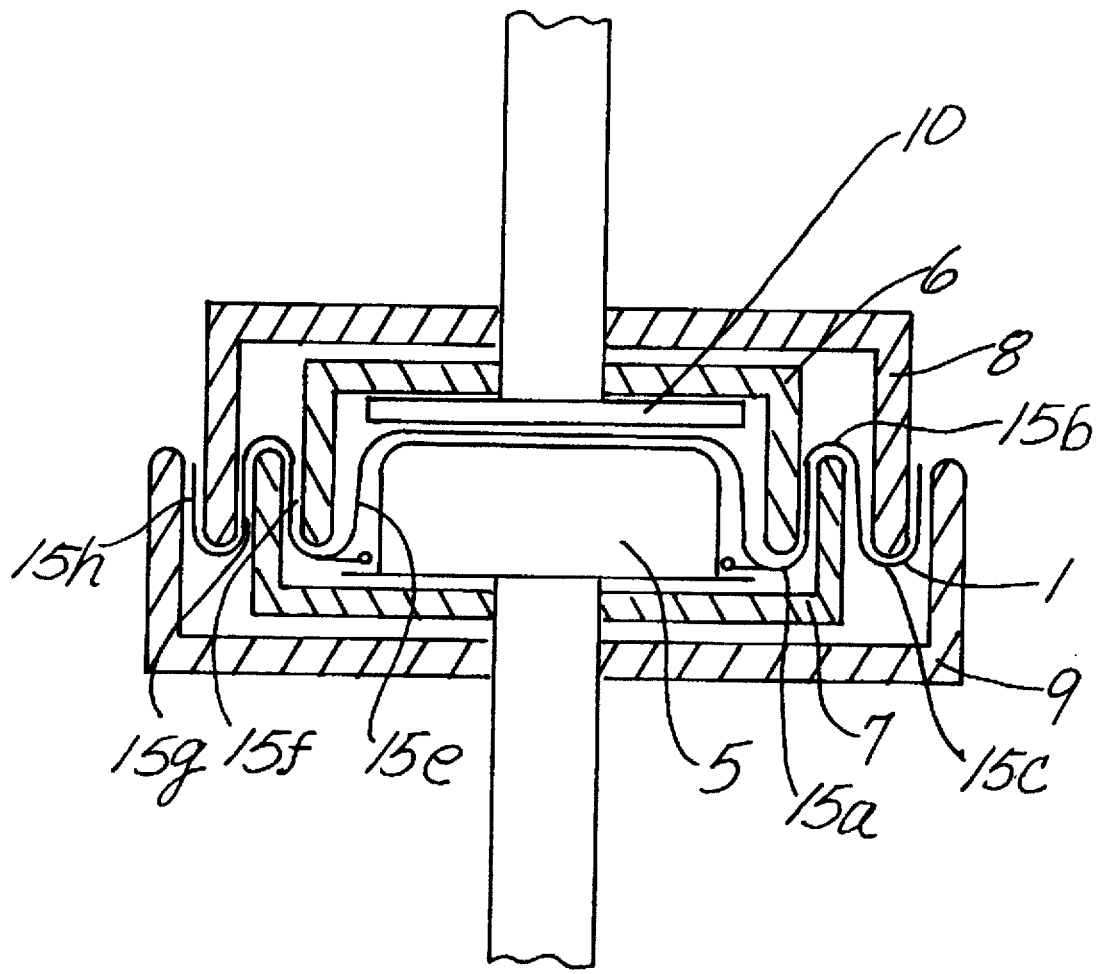
FIG. 4 shows the apparatus according to FIG. 3 when pushed together with the airbag lying between the folding elements.

The folding process proceeds as follows. First the ram of the counter holder 10 is lowered down and pressed against the base of the socket element 5 so that the top side 3 of the airbag 1 is clamped between the pot 5 and the ram of the counter holder 10. Then the folding process is started by lowering the substantially cylindrical folding element 6 whose cylinder edge defines a downwardly protruding projection whose circular shape obviously defines a closed track. The folding element 6 which is designed as a cylindrical dish is then lowered until its edge reaches a distance from the top side of the socket element 5 which corresponds approximately to the desired folded height. If the folding element 6 is lowered less then a fold of a lower height is obtained, and if it is lowered more then higher folds are formed wherein the maximum height of the folds is obviously restricted by the base of the folding element 6 striking or sitting on the counter holder 10. If required, the folding element 6 can however also have a larger base recess so that it can slide completely past the counter holder 10. The top side 3 of the airbag 1 is thereby folded down round the cylindrical walls of the socket element 5. Depending on the length of the walls of the folding element 6 the underneath 3' of the airbag is thereby also seized and pressed down. Furthermore the flange 18 of the socket opening 4 can also be arranged and held further up on the pot-shaped socket elements 5 so that the top side 3 and underneath 3' of the airbag 1 lie flat on top of each other and the two are folded down together by the folding element 6. Then, possibly also at the same time as the movement of the folding element 6, the folding element 7 is moved up and brings the top side 3 and underneath 3' of the airbag up round the outside of the cylindrical folding element 6 forming a circumferential layer 15e, 15f on each side of element 6. Referring to FIGS. 2 and 4, the edge of the folding element 6 thereby forms for example the main fold line 15a wherein the main fold line lying furthest inward is formed by the edge of the socket element 5. Thus the radial secondary fold lines run up to the diameter of the socket element 5. This diameter corresponds in the illustrated example to the diameter of the injection mouth. The folding element 8 then travels down and places the two sides of the airbag 1 outside round the wall of the folding element 7 forming a circumferential layer 15g, 15h on each side of element 8. The next main fold line 15b is thereby formed along the edge of the folding element 7. Finally the folding element 9 travels up and places the top side 3 and underneath 3' of the airbag 1 round the outside of the folding element 8, whilst forming the next main fold line 15c. Each fold extends around an imaginary point, such as the center of the airbag, and for each fold there is a fold line that forms a closed track which also extends around an imaginary point, such as the center of the airbag.

The end position which the apparatus ultimately reaches is shown in FIG. 4 where it can be seen that the airbag runs zig-zag or concertina fashion between the interengaging folding elements 6, 7, 8 and 9 wherein by sliding the folding elements into each other the outer areas of the airbag would be drawn successively inward and substantially radially aligned secondary fold lines would form by themselves or controlled by the dish shape. The folding elements 6, 7, 8, and 9 are then drawn back again axially into the starting position shown in FIG. 3. If required, stripper elements can be provided which prevent the airbag folds formed from extending as the folding elements are moved apart.

FIGS. 16 and 17 show two variations wherein the folding elements are each movable individually only on one side whilst they are connected together on the opposite side into a rigid folding matrix. In the embodiment of FIG. 16 the lower folding elements 23a are designed as a folding matrix of concentric fixedly connected elements wherein the individually movable folding elements 6, 8 can project from above between the interspaces which are formed by the folding elements 23 a. The folding element thereby projects into an inner interspace which is formed between the socket element 5 and the furthest inward folding element of the folding matrix 23 a. In plan view the folding elements 6, 8, and 23 a obviously have substantially the same shape and can thus run circular, elliptical or according to any other contour. In the variation shown in FIG. 17 the airbag hangs down owing to its own weight. It is therefore (where necessary) held and guided by horizontally movable elements 24.

Figure 5:
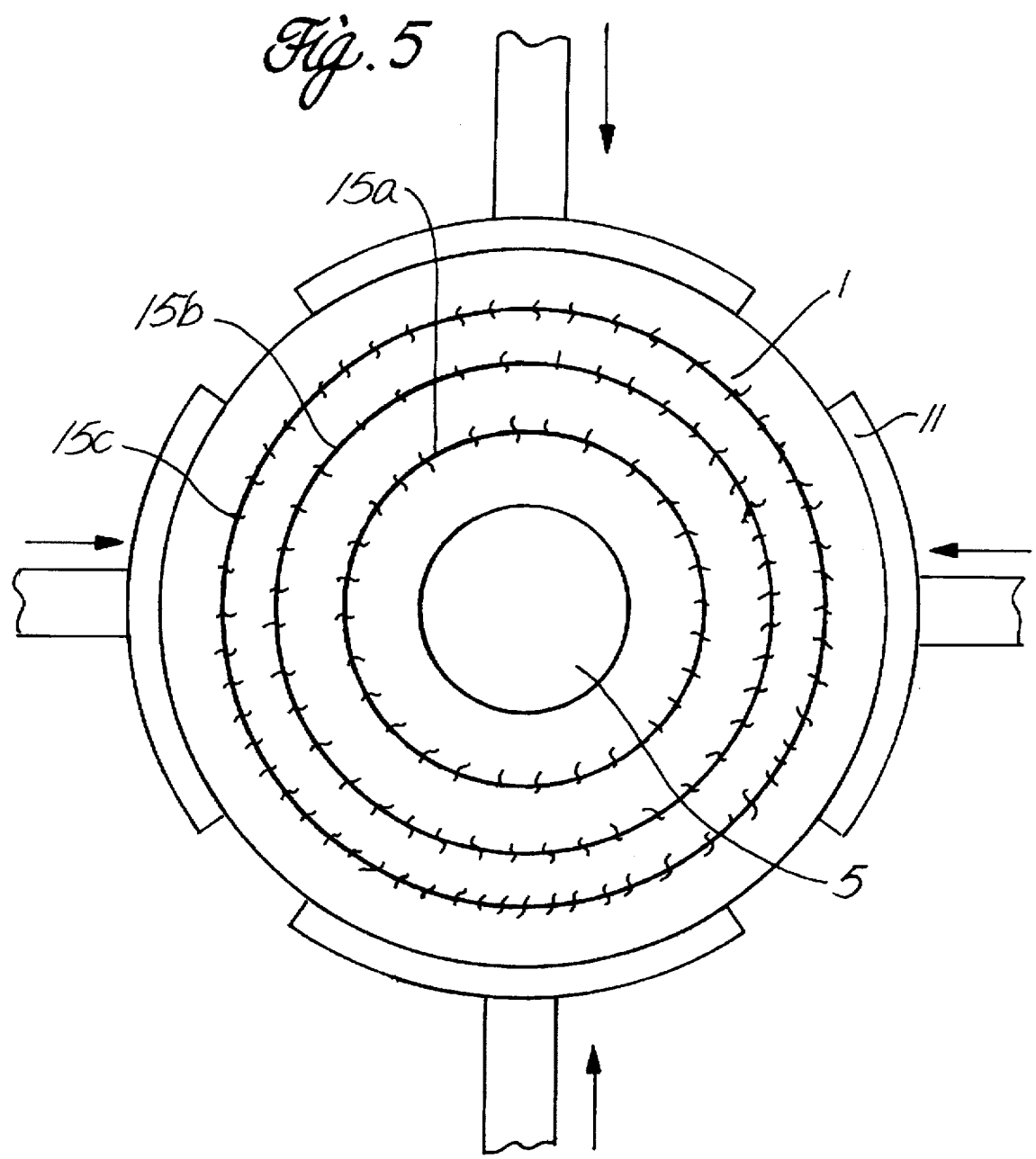
FIG. 5 shows diagrammatically the pre-folded airbag compressed further with radial folding elements.

FIG. 5 shows in axial plan view the concertina-type pre-folded airbag packet after the folding elements 6 to 9 have been drawn together. The socket element 5 thereby remains at first in the original position and supports the airbag packet. Now the radial folding elements 11 come into effect which are arranged in pairs opposite one another whereby each one opposing pair is moved inward in the radial direction in succession thereby compressing the airbag packet in the radial direction. The cylindrical socket element 5 thereby serves as an abutment. Particularly with this radial compression the fold lines 15a to 15c which are initially only outlined become clearly marked as the folds are pressed together.

It is obviously also possible to remove the socket element 5 before the radial compression and to design the opposing elements 11 so that during compression any other different shape is given to the airbag packet. Examples of this are shown in FIGS. 8a to 8f. In detail, the folded airbag is shown in circular, triangular, polygonal, ring segment, star, and meander shapes.

Figure 6:
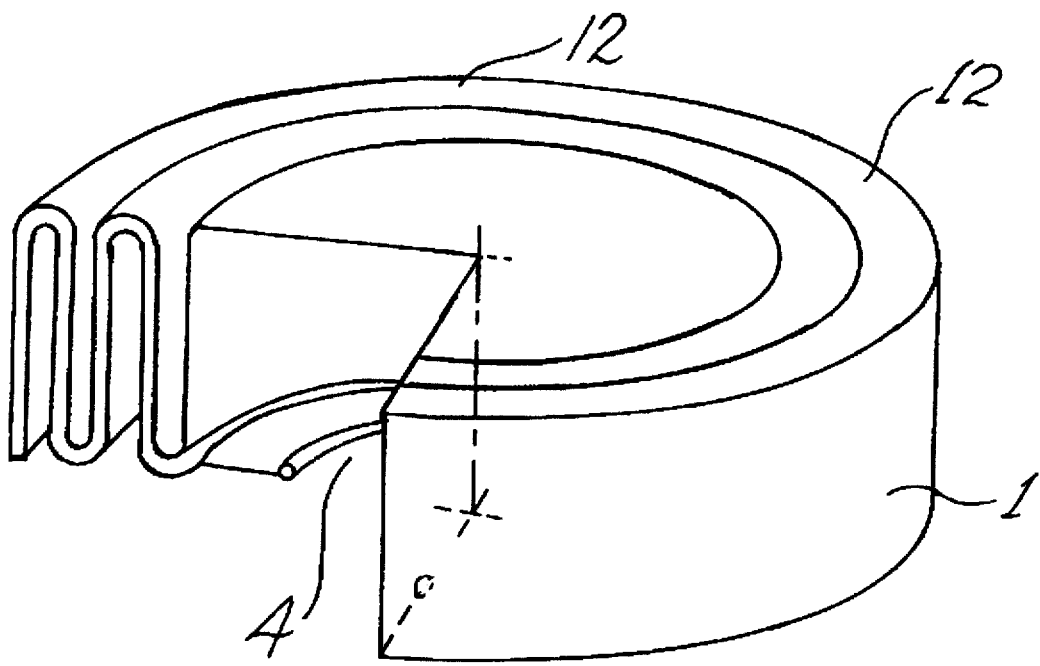
FIG. 6 is a diagrammatic illustration, partly in section, of a pre-folded airbag.

FIG. 6 also shows a diagrammatic, perspective illustration of the pre-folded airbag packet with the front right-hand quarter cut away. It is evident that through the radial compression the distances between the folds and individual layers of the airbag top and bottom sides can still be considerably reduced.

FIG. 7 shows the parameters of the pre-folded airbag in section. The inflation opening 4 or its flange 18 has a radius $r_i$. The flange 18 can be fixed on a holding plate (not shown) and/or gas generator. The outer radius $r_a$ of the pre-folded airbag depends on the number of layers of top and bottom sides of the airbag lying on top of each other in the radial direction and thus on the radius of the spread-out airbag and the height H of the individual folds. The higher the height H with a given airbag diameter then the smaller the number of folds and radially superposed layers. It is obvious that where the spread out airbag 1 has a non-circular outline the radius $r_a$ can be different measured in different directions if the number of folds likewise differs in various radial directions.

Figure 8A:
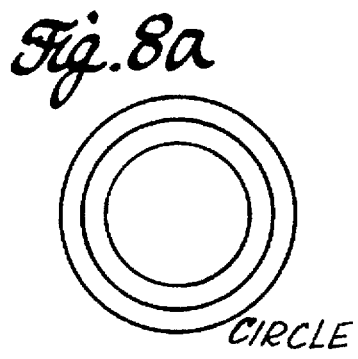
FIGS. 8a–8f, shows possible end shapes of an airbag after further compression from the pre-folded position.
Figure 8B:
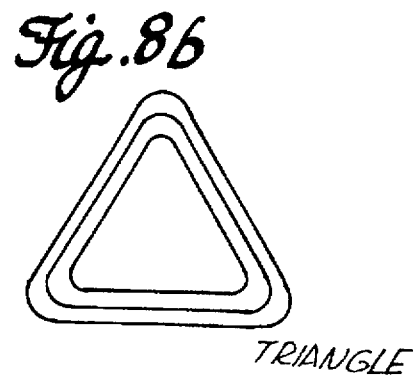
Figure 8C:
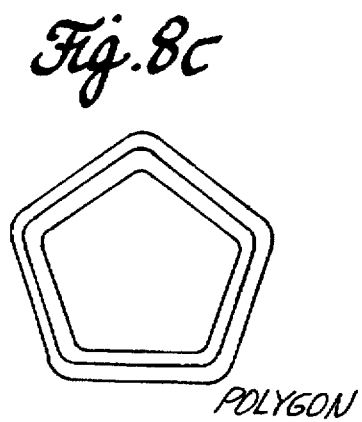
Figure 8D:
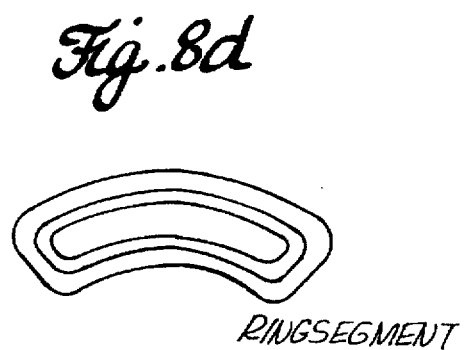
Figure 8E:
Figure 8F:
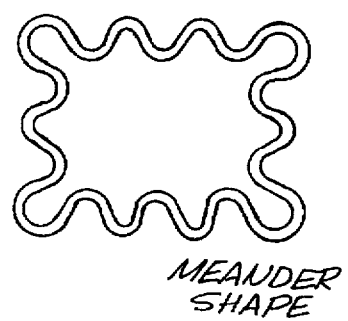

The airbag pre-folded according to FIG. 7 is then pressed together in the radial direction into substantially any shape, such as for example those shown in FIGS. 8a to 8f. Naturally the most obvious is the circular shape illustrated in FIG. 8a which can be stored particularly well in the center of a steering wheel. However, depending on the space available, the airbag packet can also be compressed into the other end shapes shown in FIG. 8, thus for example into the shape of an equilateral triangle or more generally into a polygon as in FIG. 8c or even into a ring segment as in FIG. 8d wherein this shape can be particularly expedient for certain designs of steering wheel centers. Finally exotic shapes such as the star shown in FIG. 8e or the meander shape shown in FIG. 8f are also possible and can be readily achieved.

Figure 9A:
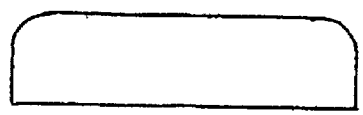
FIGS. 9a–9f, shows different pack forms which can be obtained by corresponding pre-folding and after-folding.
Figure 9B:
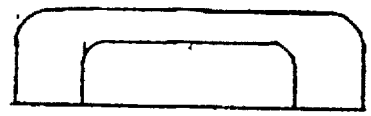
Figure 9C:
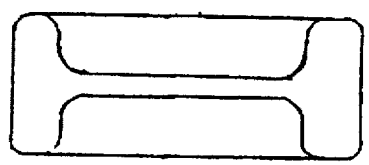

Numerous different shapes can also be achieved in section or in side view, as shown for example in FIGS. 9a to 9f. A section or side view according to FIG. 9a can be achieved for example when compressing the airbag into a rectangular packet or ring segment such as for example in FIG. 8d. FIG. 9b corresponds to the ring shape shown in FIGS. 6 and 7. The pack shape according to FIG. 9c is achieved in a quite similar way so that with reference to FIGS. 3 and 4 only the socket element 5 here has a clearly smaller axial extension than the folding elements 6 so that the fold height H is clearly greater than the height of the socket element 5 and thus of the central section of the folded airbag.

Figure 9D:
Figure 9E:
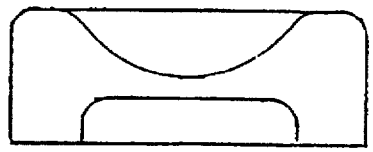

By varying the fold heights (different axial lengths of the folding elements 6 to 9) it is finally also possible to obtain the variations shown in FIGS. 9d and 9e.

Figure 9F:
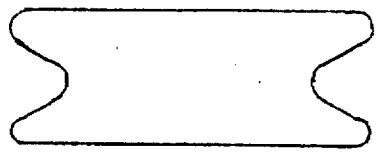
Figure 10:
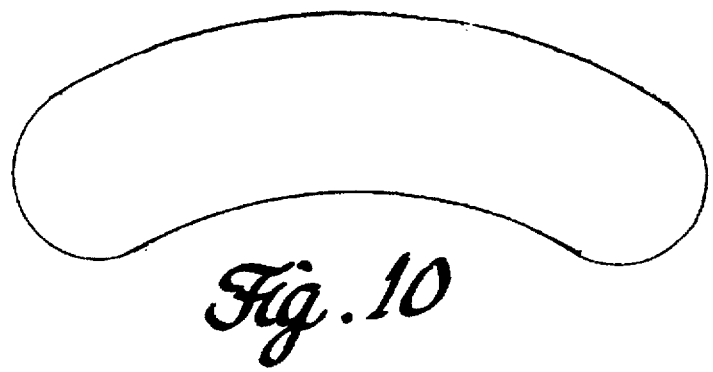
FIG. 10 shows the contour of a kidney-shaped airbag spread out and unfolded.
Figure 11:
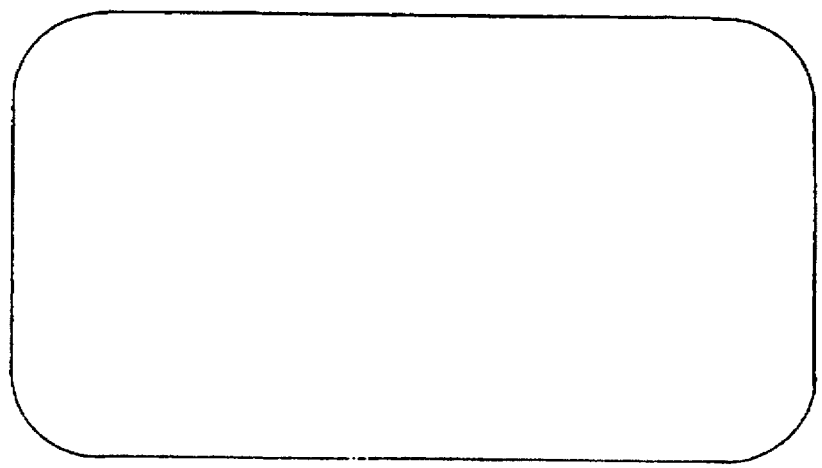
FIG. 11 shows the contour of a substantially rectangular airbag spread out and unfolded.

FIG. 9f shows an airbag packet which is gathered up in the center. FIGS. 10 and 11 illustrate examples of unfolded spread-out airbags which have a kidney or rectangular shape rather than a circular shape. The corresponding main fold lines can thereby be adapted to this outer contour although it is however also possible to provide circular main fold lines such that from exceeding a certain radius these main fold lines intersect the outer contour of the unfolded airbag.

Figure 12:
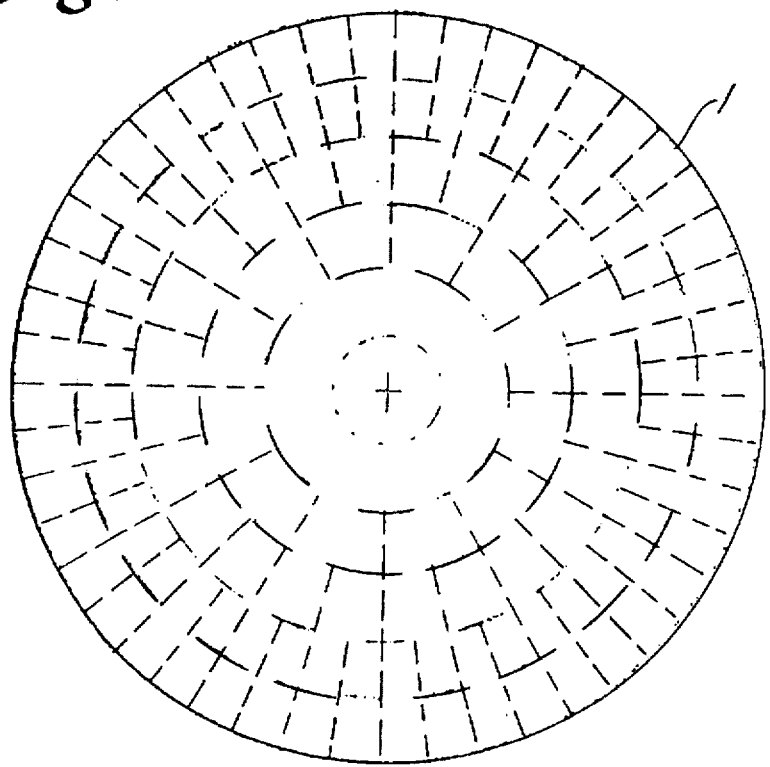
Figure 13:
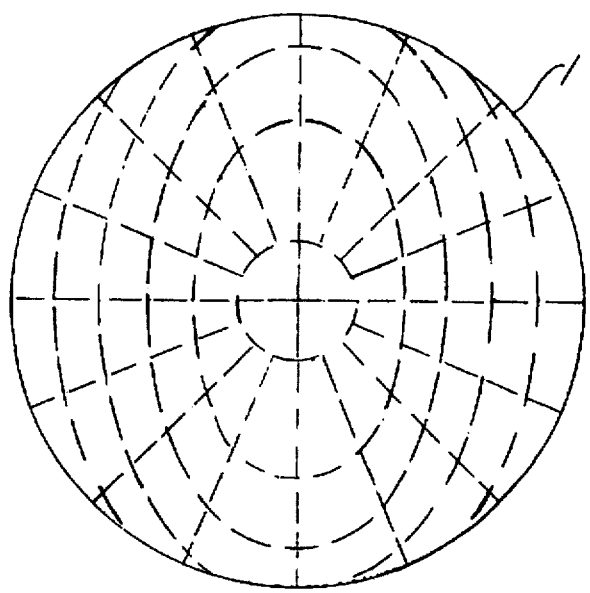
FIG. 13 shows a circular airbag with elliptical main fold lines which partly intersect the edge of the airbag.
Figure 14:
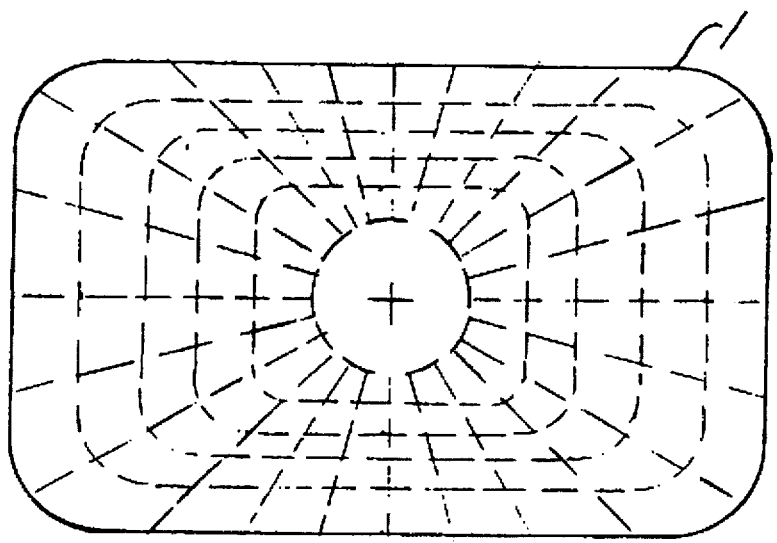
Figure 15:
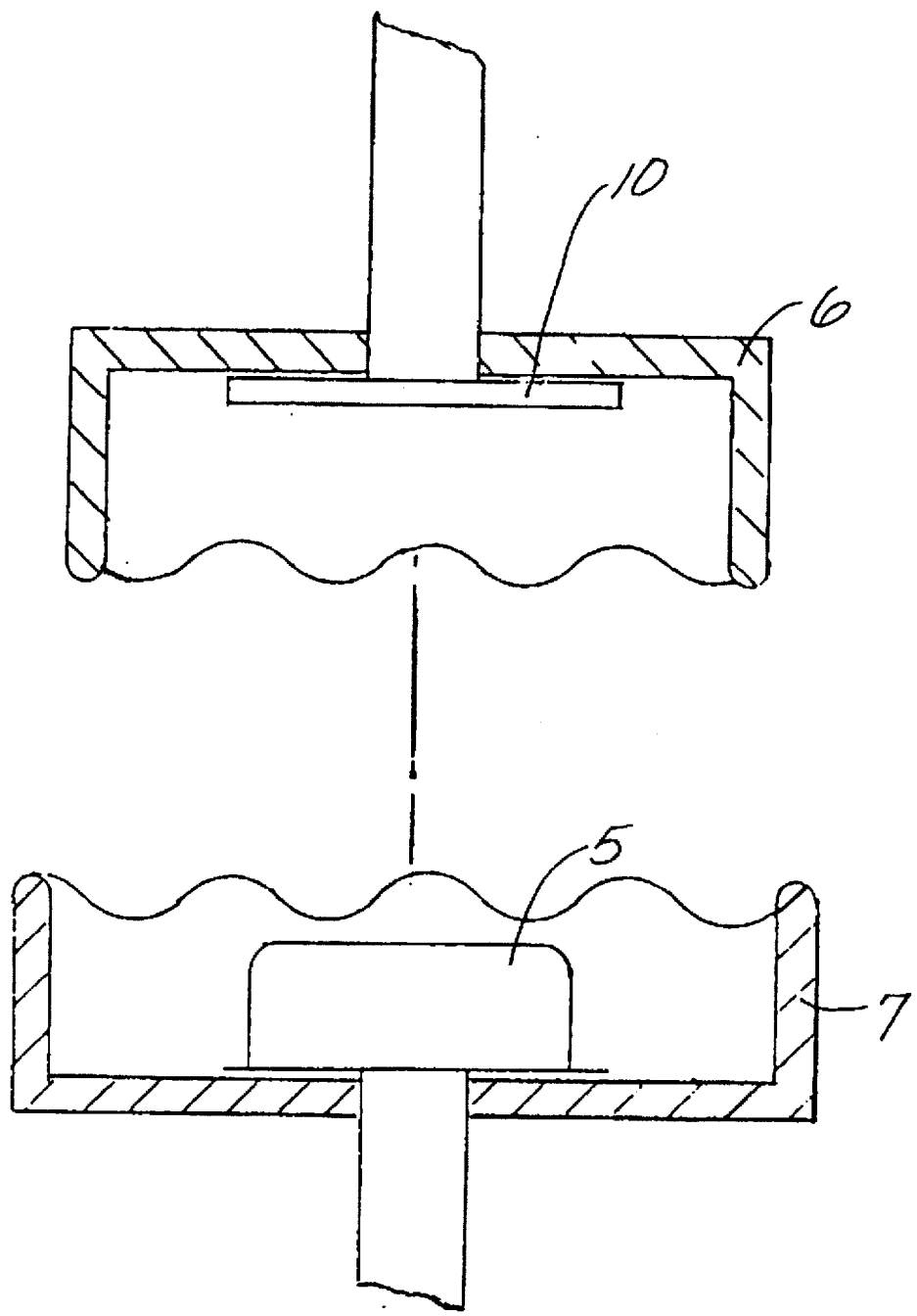
FIG. 15 shows a section along a plane containing the axis of an apparatus for folding an airbag according to the invention, that has folding elements with wavy edges to produce the secondary folds.

FIGS. 12 to 14 show the main fold lines running on different paths wherein FIG. 12 corresponds to the FIG. 2 already discussed above whilst FIG. 13 shows elliptical main fold lines on a circular airbag so that here the main fold lines lying further outward intersect the contour of the airbag and thus no longer form closed tracks. A similar situation arises, as already mentioned, if circular main fold lines are provided on an airbag with a non-circular outer contour.

FIG. 14 illustrates the example of an airbag with a substantially rectangular contour wherein the main fold lines are adapted to this outer contour and likewise each define the shape of a rectangle wherein the corners of the rectangle are each rounded.

Thus, there is one or more folds each of which extends around an imaginary point, such as the center of the airbag, also for each such fold, there is a fold line that forms a closed track which also extends around an imaginary point, such as the center of the airbag.

Figure 18:
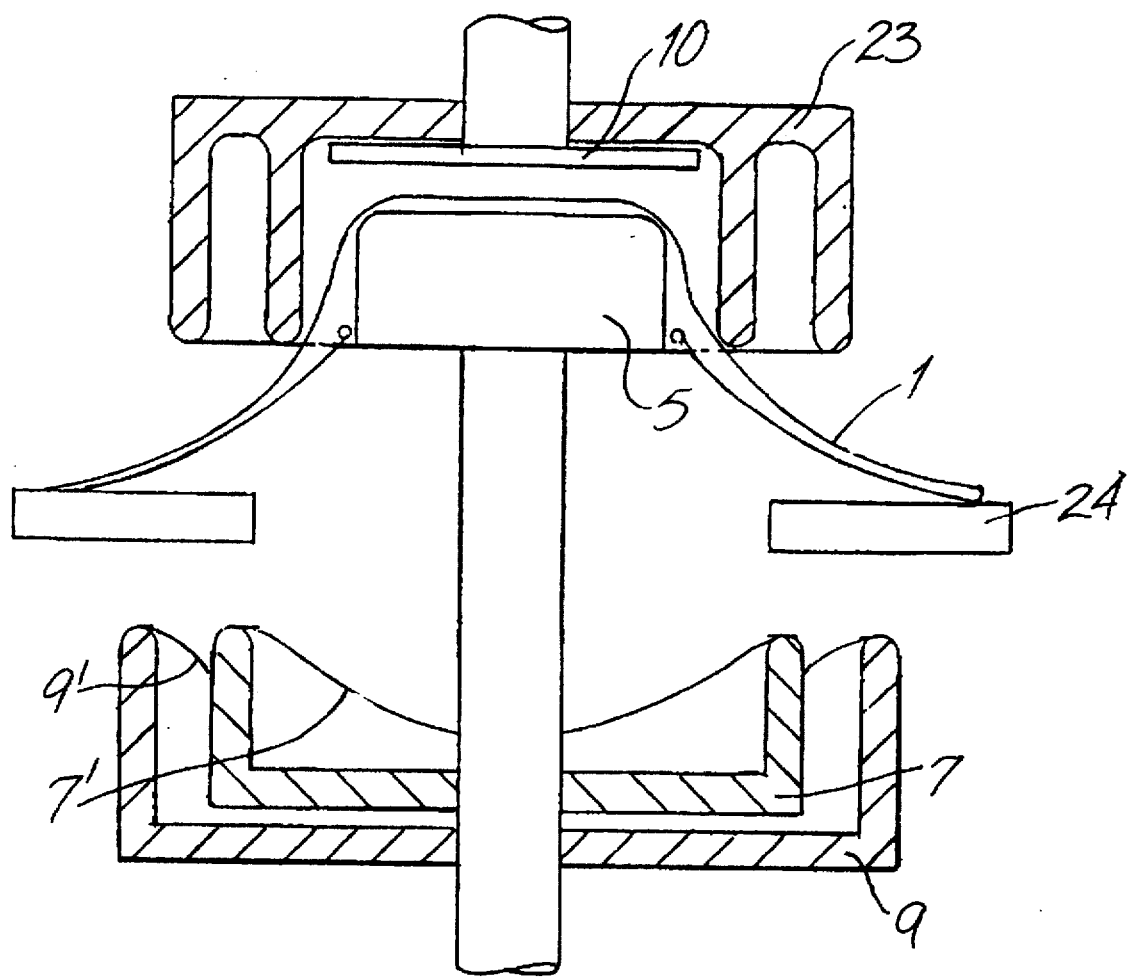
FIG. 18 shows folding elements with curved edges to produce elliptical main fold lines.

In the lower part of the folding apparatus shown in FIG. 18, the folding elements 7, 9 have curved edges 7', 9', while the upper part may for instance have the form shown in FIG. 17. The development of an elliptical contour of the main fold lines is promoted by the curved edges 7', 9' of the lower part.

Figure 19A:
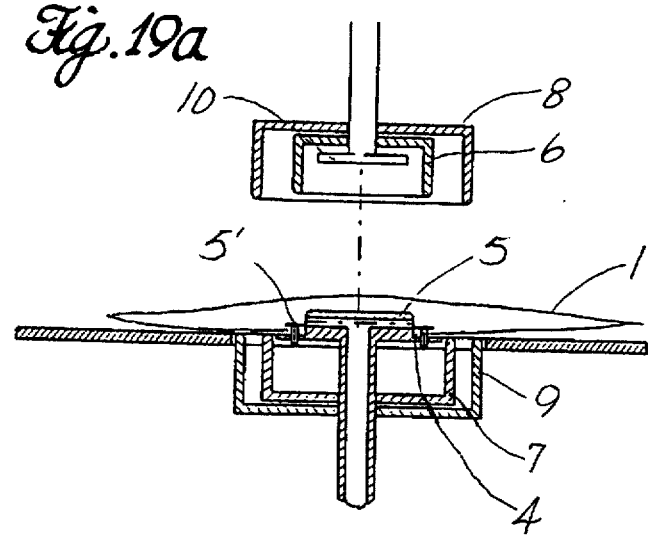
FIGS. 19a–19o, shows the automatic folding of an airbag for the driver's side of an automobile.
Figure 19B:
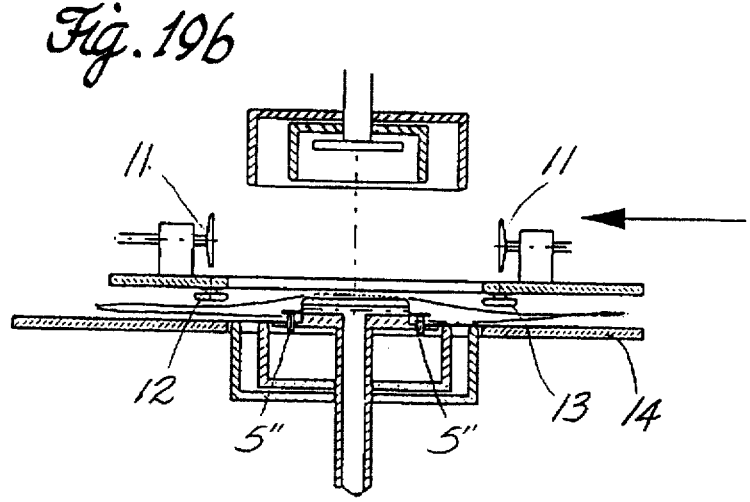
FIG. 19, subdivided into
Figure 19C:
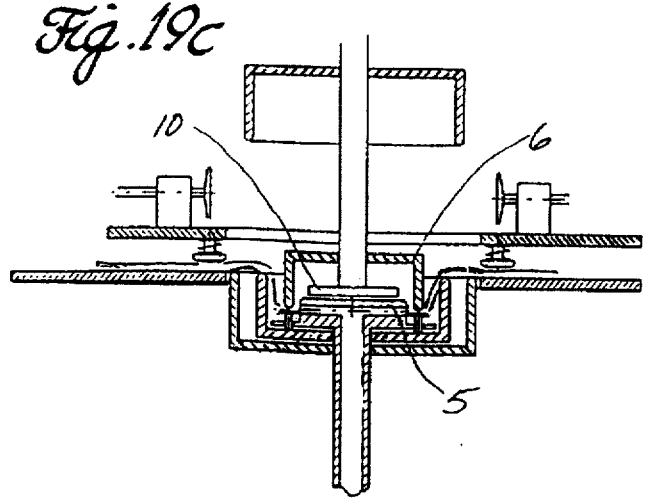
Figure 19D:
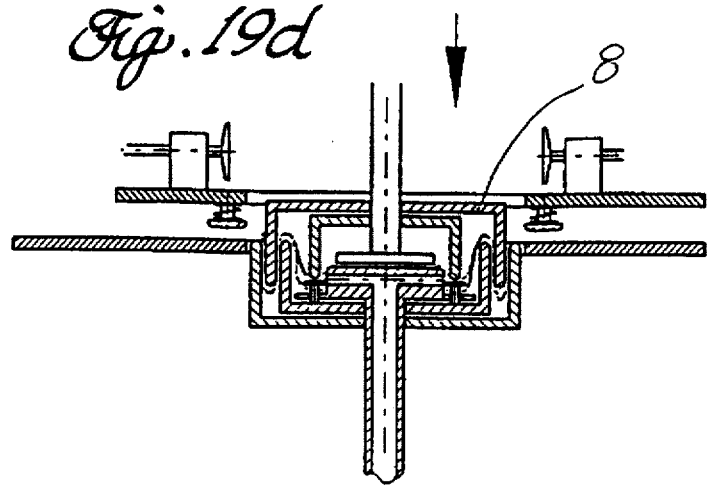
Figure 19E:
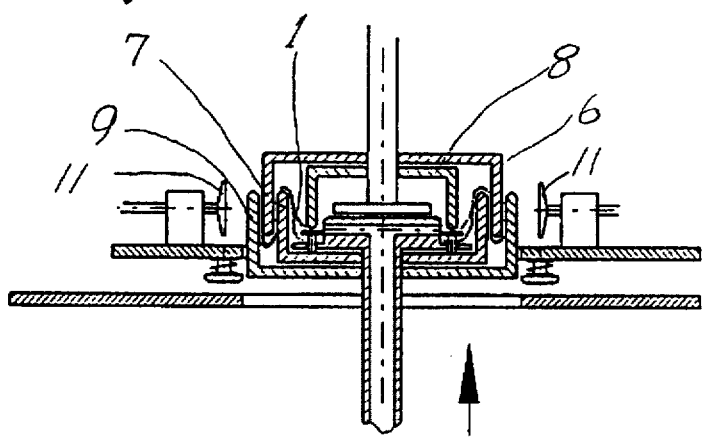
Figure 19F:
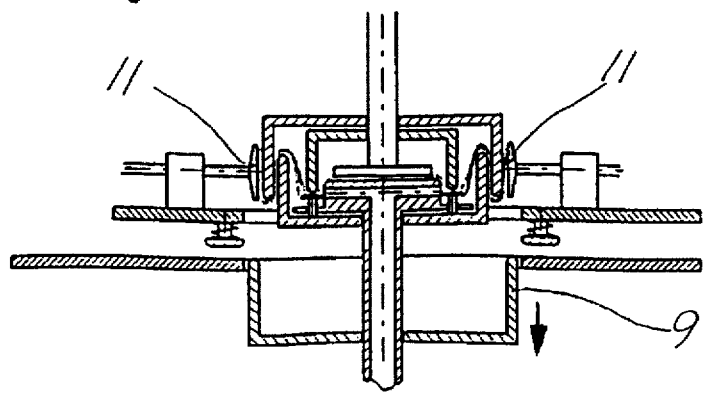
Figure 19G:
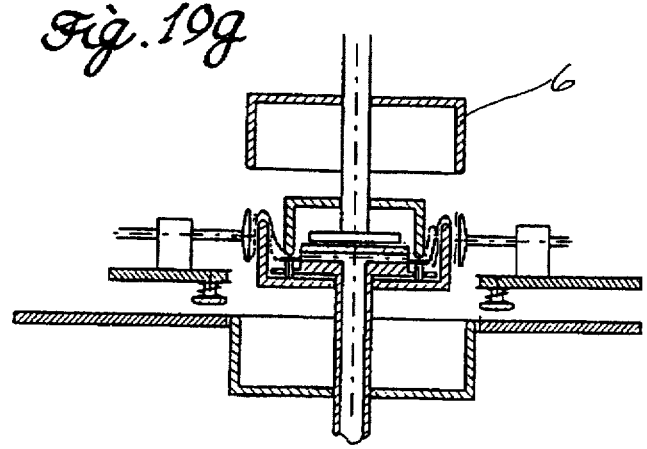
Figure 19H:
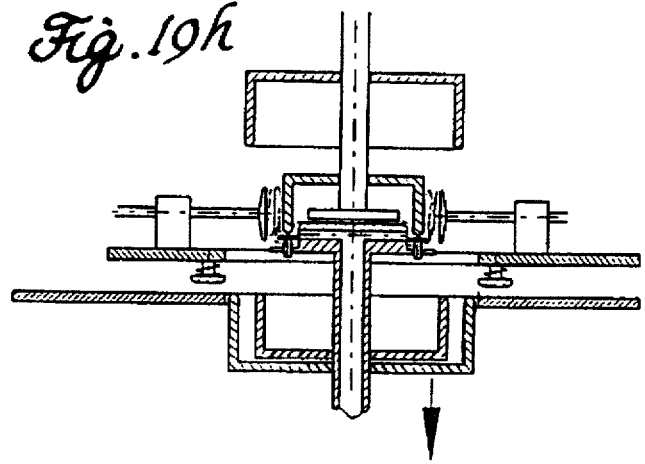
Figure 19I:
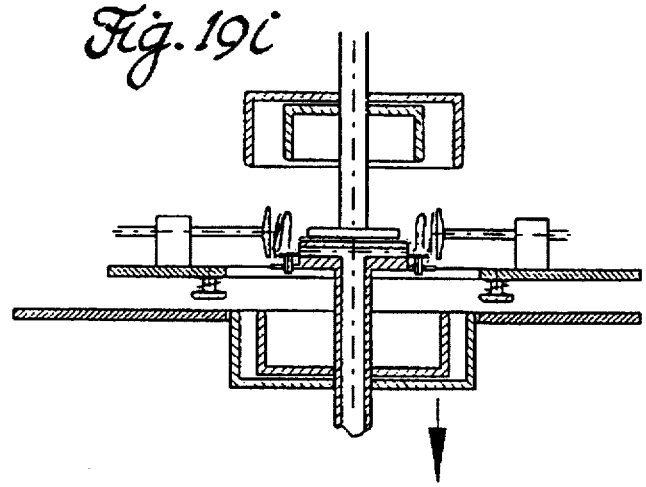
Figure 19J:
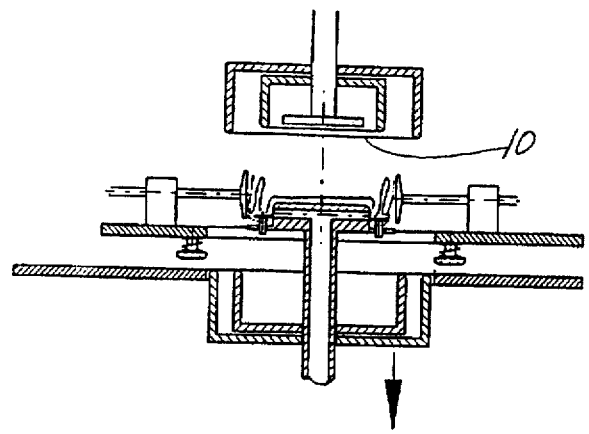
Figure 19K:
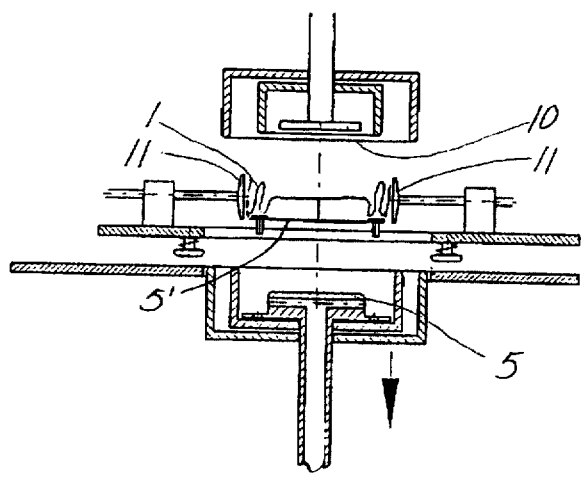
Figure 19L:
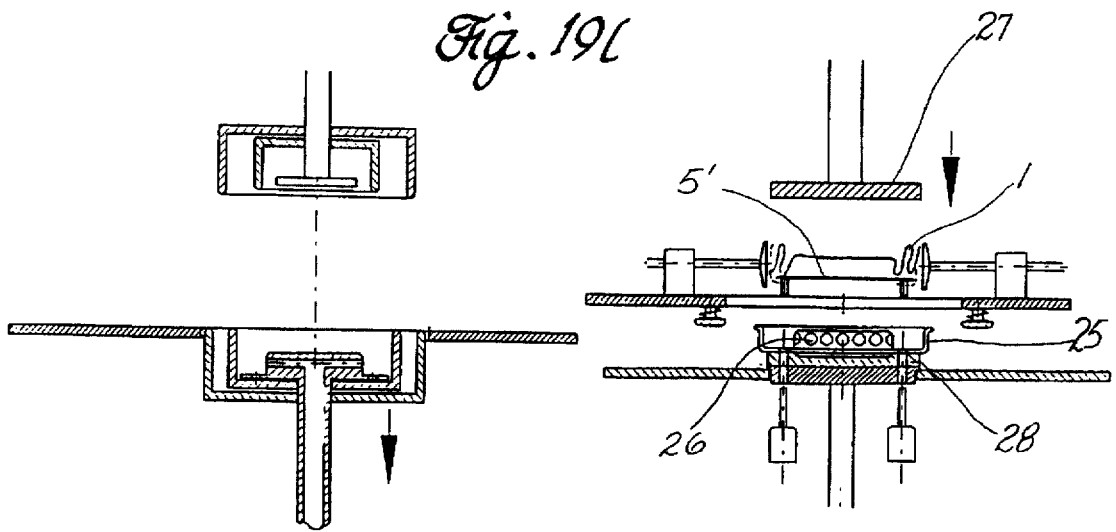
Figure 19M:
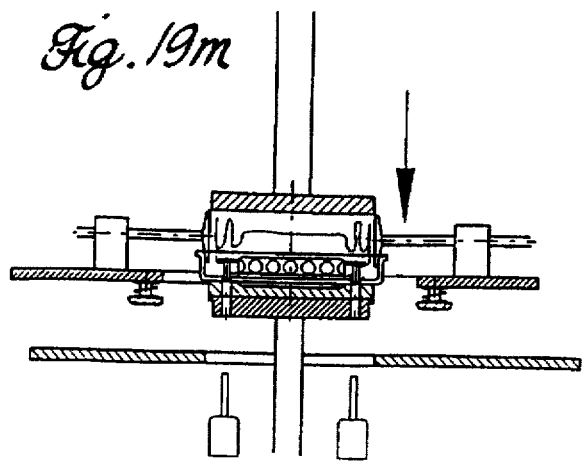
Figure 19N:
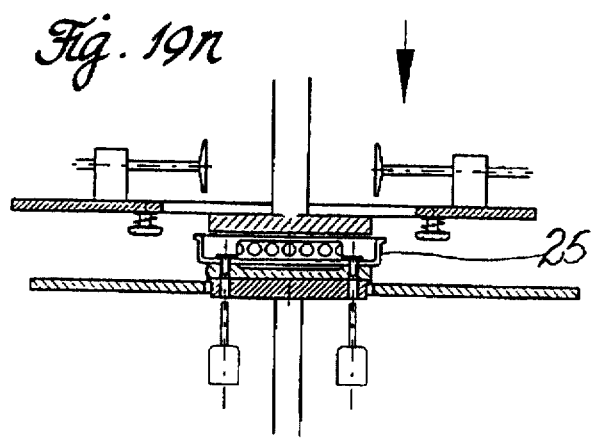
Figure 19O:
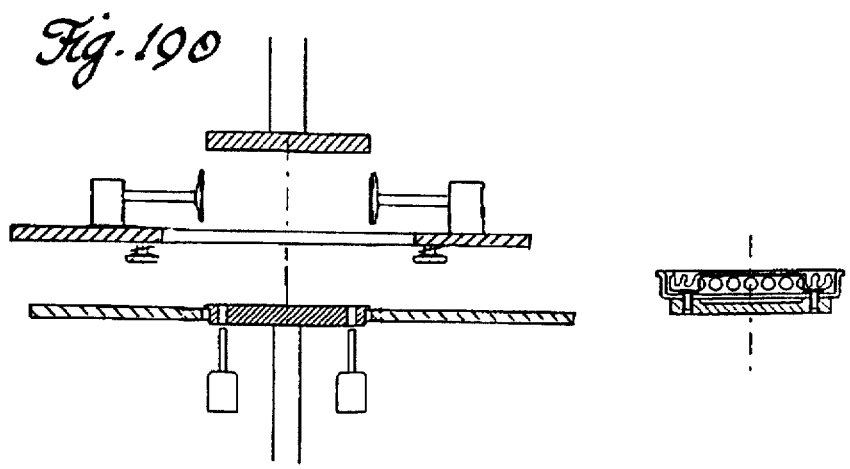

In FIGS. 19a–19o, the entire course of the process is shown. In FIG. 19a, a retaining ring 5' is first introduced into the receiving opening 4 (also called the mouth of the airbag) of an airbag 1. The retaining ring is provided in the region of the socket element 5. The screws 5" (FIG. 19b) secured to the retaining ring are then inserted from the inside through the bores intended for them, surrounding the receiving opening 4. Next, the airbag is mounted with the retaining ring on the socket element 5. The position of the airbag is thus fixed. Both the folding elements 6–9 and the counter holder 10 are located in their outset position at this time. In the next step (FIG. 19b), the gathering mechanism with the radial folding elements 11 is moved to the apparatus.

Already at this stage, a gas generator could be provided instead of the retaining plate.

Before the folding is done, the holding-down elements 12, 13 are moved outward on the underside of the gathering mechanism and press the spread-out airbag 1 against the table top 14. The holding-down devices 12, 13 are intended to guide the airbag 1 during the folding operation.

Folding of the airbag 1 begins by moving the counter holder 10 toward the socket element 5; the first folding of the airbag is performed (FIG. 19c) by the folding element 6. Next, the folding element 8 is moved downward, thereby making the second folding of the airbag (FIG. 19d). In this exemplary embodiment, only two folding elements 6 and 8 or 7 and 9 are shown. If it is necessary to perform further folding, naturally further folding elements may be provided.

In the next step (FIG. 19e), the complete folding apparatus with the folding elements 6–9 and the airbag located between them is moved upward, between the radial folding elements 11 of the gathering mechanism. As shown in FIGS. 19f–19k and the folding elements 6–9 are then moved incrementally upward or downward, beginning with the outermost folding elements. In the same way, the radial folding elements 11 are moved toward the airbag in increments, so that finally the folded airbag 1 rests freely between the radial folding elements 11 (FIG. 19k). Next, the counter holder 10 is moved upward and the socket element 5 is moved downward, so that the airbag 1 now rests freely between the radial folding elements 11.

In the next step (FIG. 19l), the gathering mechanism is now moved, together with the airbag 1, into a packing apparatus. The folded airbag 1 with the retaining ring 5' rests freely between the radial folding elements 11. In the packing apparatus, a generator holder 25, a gas generator 26, a die 27 and a tool holder 28 are provided. These elements are now moved upward or downward and positioned opposite the folded airbag 1. By lowering the die 27 further (FIGS. 19m–19n), the airbag is pushed out of the gathering mechanism and pressed into the generator holder 25.

The airbag is secured in the generator holder 25 either by frictional engagement or form-fittingly. In a final step (FIG. 19o), the generator holder 25, with the folded airbag located in it, is finally moved out of the apparatus and is now available for installation in the steering wheel.

Figure 20:
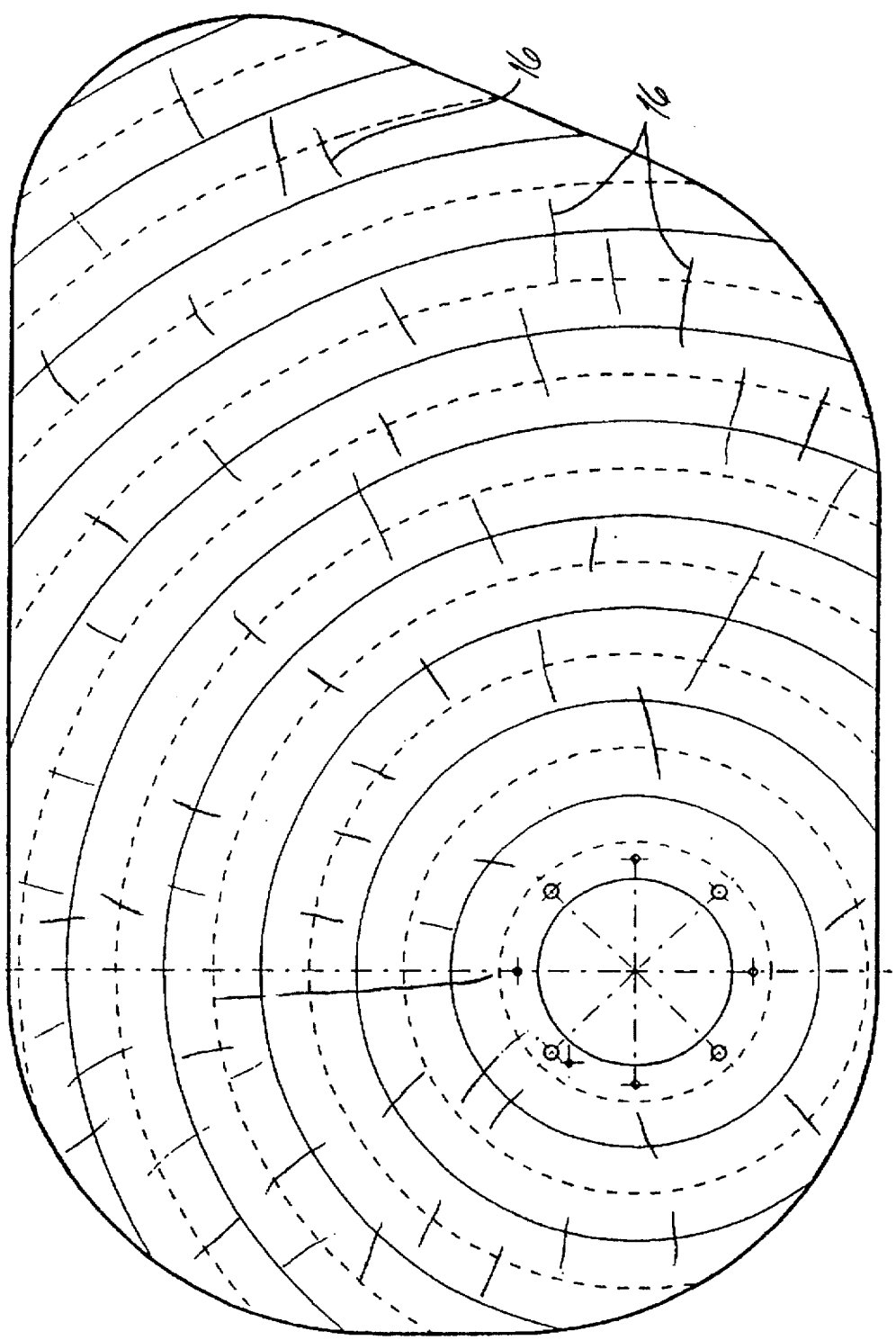
FIG. 20 shows a side bag in the unfolded state.

In FIG. 20, a side bag, which is intended to protect the passengers in a vehicle from a side crash, is shown in the unfolded state. In this drawing figure, the secondary fold lines 16 are not shown schematically, as in the previous examples, but rather as they actually appear as a result of the folding operation.

Figure 21:
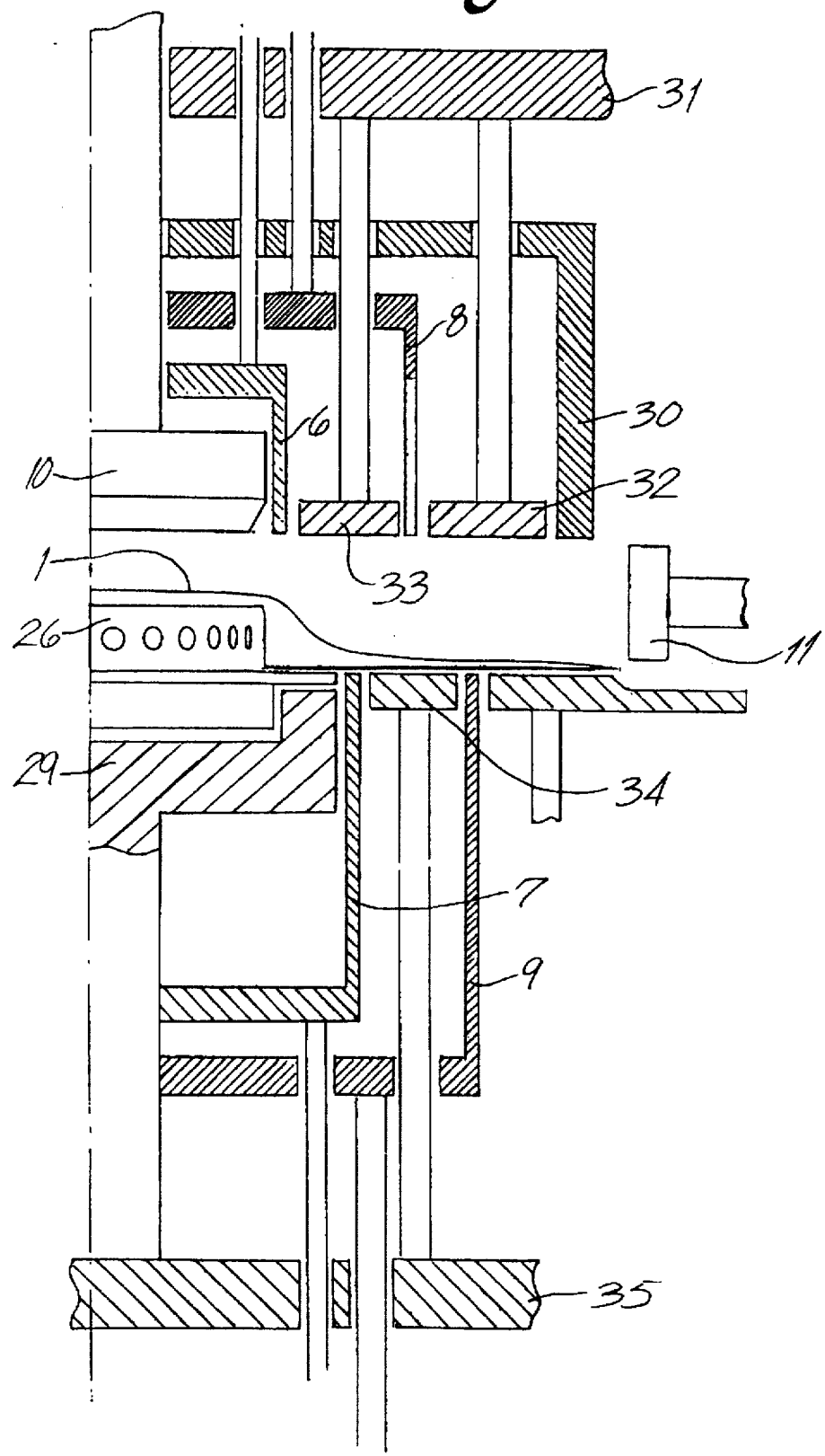
FIG. 21 shows a section taken along a plane containing the axis of an apparatus for folding a sidebag according to the invention.

FIG. 21 shows a folding tool for folding the side bag of FIG. 20. However, this tool is not limited to folding the side bag and can instead can also be used to fold the driver's-side or passenger-side airbag. This tool is essentially equivalent to the tool used for the folding shown in FIG. 19. The difference is that intermediate rings 32, 33, 34 are provided at fasteners 31, 35, and these rings are intended to prevent the main folds, when there are many of them as in the case of a side bag, from shifting upward or downward during the radial gathering operation. The spacing between the upper intermediate rings 32, 33 on the one hand and the lower intermediate rings on the other, of which latter there is only one intermediate ring 34 in this embodiment, is equivalent to the height H of the folded airbag 1.

The following tool for folding a side bag of FIG. 21 is operated as follows. The airbag 1 and the gas generator 26 are first placed in the receptacle 29. Next, the lower part shown, along with the fastener 35 for the intermediate ring 34 and with the folding elements 7, 9, is moved as a complete unit up to the height shown, or in other words as far as the region of the gas generator 26. Only some of the folding elements are shown.

Next, the holding-down devices 10 and 30 are lowered, and the folding and gathering process illustrated in FIGS. 19a–19o takes place. During the gathering, the intermediate rings 32, 33, 34 remain in the position shown, with the spacing H that is equivalent to the fold height. Once the folding and gathering is concluded, the lower part is lowered as a complete unit, and the gathering mechanism, with the folded, gathered airbag, is pushed into the packing station, as has been described in conjunction with FIGS. 19l–19o.

Figure 22:
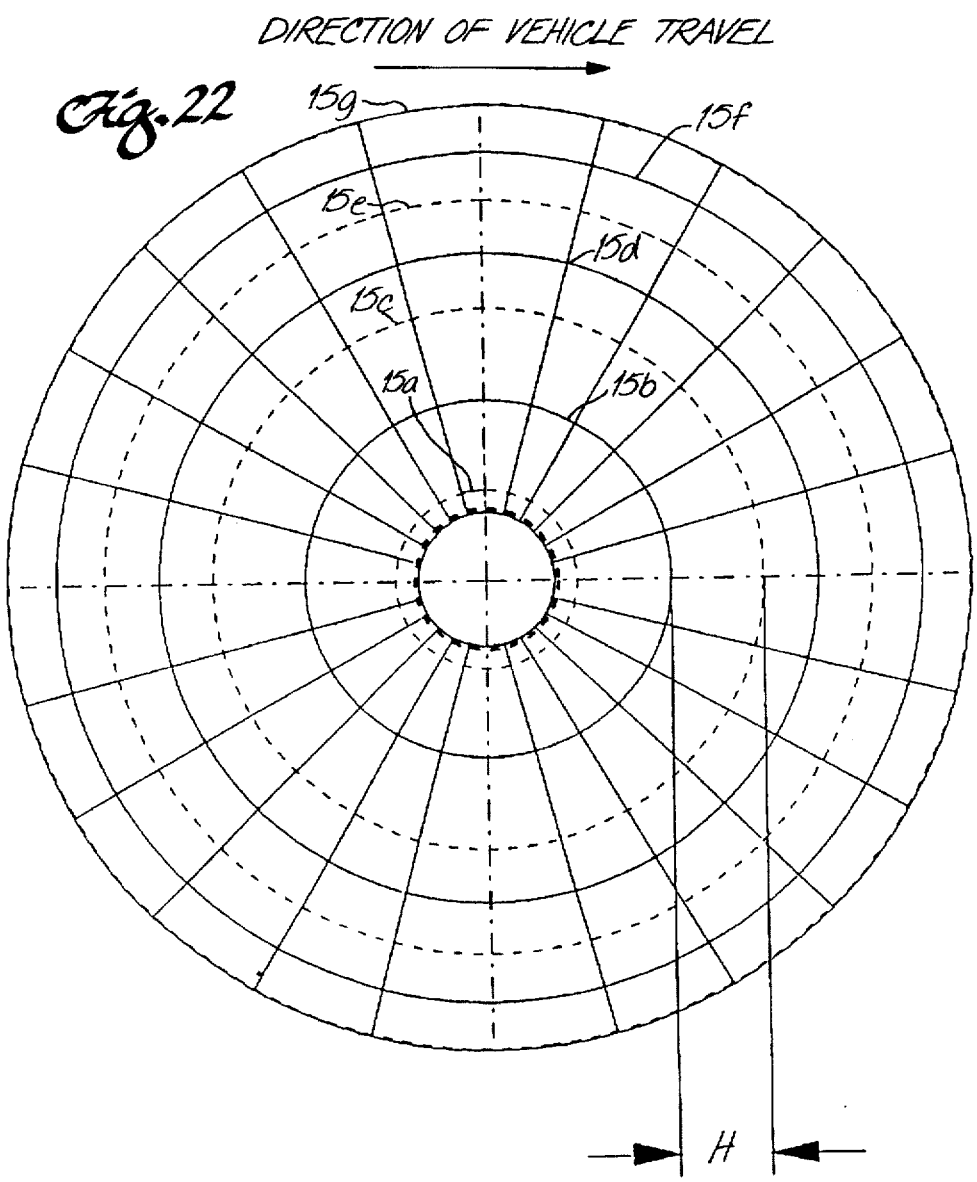
FIG. 22 shows an unfolded airbag with circular main fold lines extending at various intervals.
Figures 22A, 22B:
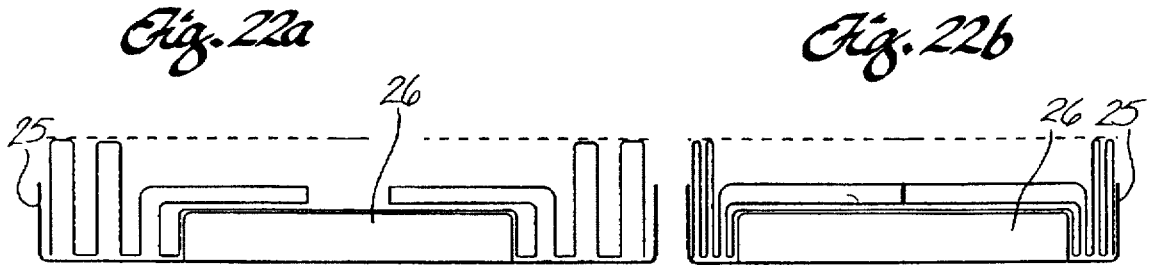
FIG. 22a shows the gathering of the airbag of FIG. 22 transversely to the direction of vehicle travel.
FIG. 22b, shows the gathering of the airbag of FIG. 22 in the direction of vehicle travel.

FIG. 22 shows an unfolded airbag with main fold lines 15a–15g. The solid lines stand for the raised fold lines, while the dashed lines stand for the recessed fold lines. FIG. 22a shows the airbag of FIG. 22, after folding, in a section taken transversely to the direction of vehicle travel. The inner fold here has a greater height than the outer fold. This is suitable if free space is available above the gas generator for bending the inner portions of the folded airbag at an angle.

FIG. 22b is a section taken through the folded airbag in the direction of vehicle travel. Since there is less space available there (the generator holder 25 is not as wide as it is transversely to the direction of vehicle travel), the folded parts are closer together than transversely to the direction of vehicle travel.

Figure 23:
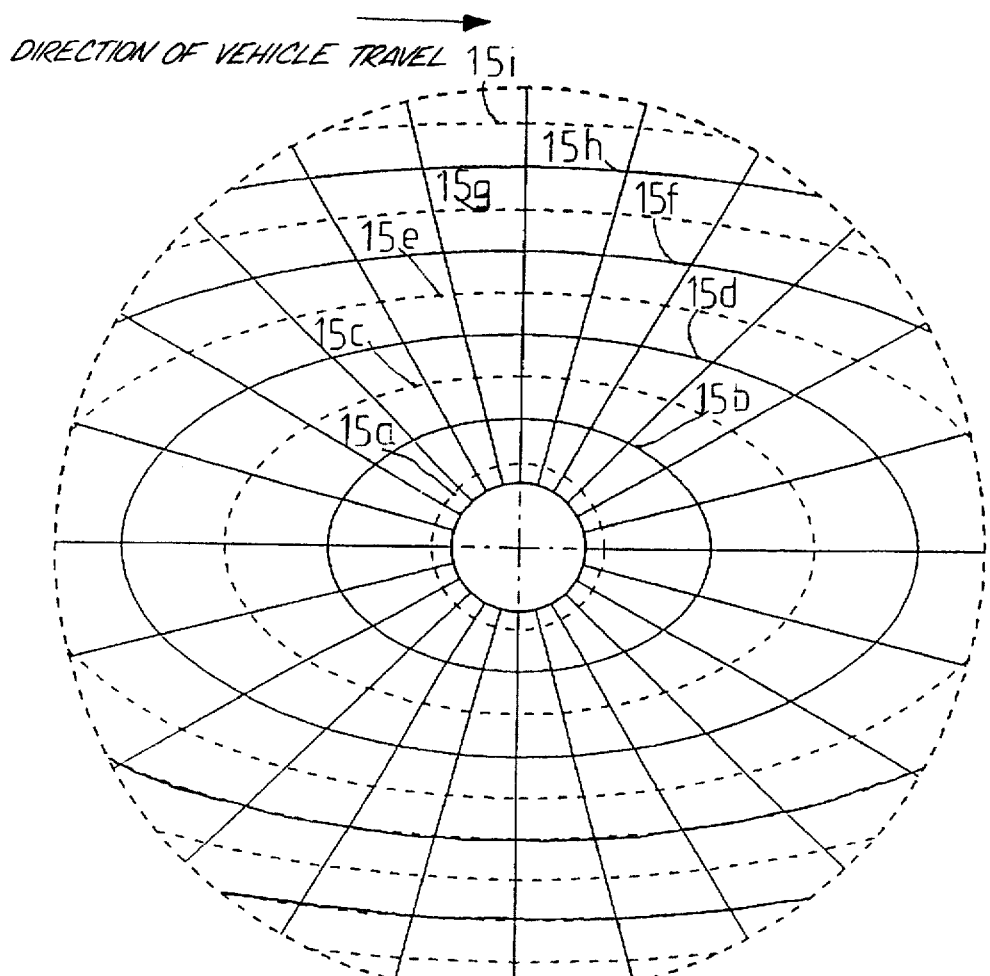
FIG. 23, shows an unfolded airbag with elliptical main fold lines extending at various intervals.
Figure 23A:
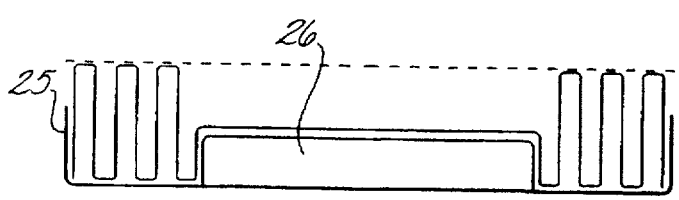
FIG. 23a shows the gathering of the airbag of FIG. 23 transversely to the direction of vehicle travel.

FIG. 23 shows an unfolded airbag with main fold lines 15a–15i, in which the main fold lines have an elliptical course. As a result, the spacing between the fold lines in the direction of travel is greater than transversely to the direction of travel. FIG. 23 a shows a section through the airbag of FIG. 23 in the folded state transversely to the direction of travel. It shows how the folds of equal height are located next to the gas generator 26.

Figure 23B:
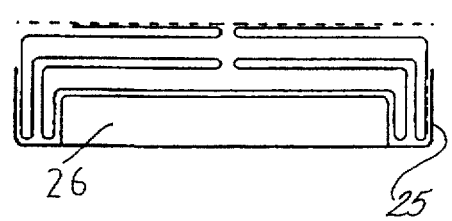
FIG. 23b shows the gathering of the airbag of FIG. 23 in the direction of vehicle travel.

FIG. 23b is a section through the folded airbag in the direction of travel. Because of the elliptical form of the main fold lines, they have a greater height in the direction of travel than transversely to it and also have a variable height. Since, because of their elliptical shape, the main fold lines intersect the edge of the circular airbag, they are present in a reduced number in the direction of travel. The higher segments of the main fold lines are bent at an angle and, as can be seen in FIG. 23b, rest in the space above the gas generator.

The airbag folded according to the invention can be inflated very rapidly and easily, can be adapted to any predetermined pack geometry and is therefore extremely versatile. More particularly during the unfolding of such an airbag there is no longer the danger that the inner pressure produced in some areas inside the airbag will impede the opening of further folds.

The disclosure of German patent application P 43 20 610.7 filed on Jun. 17, 1993 is incorporated fully herein by reference. Priority of this German application is claimed.

While the invention has been described in detail with respect to certain preferred embodiments, it should be understood that the invention is not limited to those precise embodiments, and that those embodiments are instead representative examples of the many modifications and variations which would present themselves to those of skill in the art without departing from the scope and spirit of this invention, as defined in the appended claims.

What is claimed is:

1. A folded airbag of the type made from a flexible material and which can be used with an inflation device for rapidly filling the airbag with gas, the airbag comprising, when substantially empty and spread out, main fold lines and at least one of said main fold lines forming a closed track around an imaginary center of the substantially empty and spread-out airbag, the folded airbag further comprising at least one circumferential layer when folded.

2. The airbag according to claim 1, further comprising secondary fold lines which cross the main lines.

3. The airbag according to claim 1 in which the at least one of said main fold lines forms a circular track.

4. The airbag according to claim 1 in which the main fold lines each having a radius of curvature, and the radii of curvature of the main fold lines varies by less than a factor of 10.

5. The airbag according to claim 1 in which the main fold lines each have a radius of curvature and a smallest of said radius of curvature of the main fold lines is at least 10 mm.

6. The airbag according to claim 1 in which said at least one of said main fold line runs approximately parallel to an outer contour of the spread-out airbag.

7. The airbag according to claim 1 further comprising an opening located on one side of the airbag approximately in the imaginary center of the substantially empty spread-out airbag around which run the main fold lines.

8. The airbag according to claim 1 wherein the airbag comprises, when empty and spread out, a substantially planar surface on which said at least one of said main fold lines is formed.

9. A folded airbag of the type made from a flexible material and which can be used with an inflation device for rapidly filling the airbag with gas, the airbag comprising, when substantially empty and spread out, main fold lines and at least one of said main fold lines forming a closed track around an imaginary center of the substantially empty and spread-out airbag, in which the at least one of said main fold lines forms an ellipse of slight eccentricity.

10. The airbag according to claim 9 in which the ellipse has a ratio of main axis to secondary axis of a maximum of 2.

11. An airbag module comprising a folded airbag made of a substantially flexible material and having an inflation opening and a gas generator attached to the airbag at the inflation opening, the airbag being folded so as to form at least one circumferential layer when folded and at least one main fold line along a closed track, both the at least one circumferential layer and closed track extending around an imaginary point on the airbag.

12. The airbag module according to claim 11 further comprising a generator holder for holding the airbag and the gas generator and having an open end for releasing the inflated airbag after the gas generator is activated.

13. An airbag module comprising a folded airbag made of a substantially flexible material and having an inflation opening and a gas generator attached to the airbag at the inflation opening, the airbag being folded so that it has at least one circumferential layer when folded and one fold line that forms a substantially closed track, both the at least one circumferential layer and the closed track extending around an imaginary point on the airbag.

14. The airbag module according to claim 13, wherein said at least one circumferential layer and fold line comprise a plurality of circumferential layers and a fold line for each said circumferential layer and wherein each of said fold lines forms a closed track.

15. The airbag module according to claim 14 wherein each of said fold lines forms a closed track around an imaginary center of the airbag when substantially spread-out.

16. An improved folded airbag of the type consisting of a flexible material and which can be used with an inflation device for rapidly filling the airbag with gas, characterized in that the airbag comprises a plurality of circumferential layers when folded and a fold line for each of said circumferential layers which forms a closed track.

17. A folded airbag of the type made from a flexible material and which can be used with an inflation device for rapidly filling the airbag with gas, the airbag comprising, when substantially empty and spread out, main fold lines and at least one of said main fold lines forming a closed track around an imaginary center of the substantially empty and spread-out airbag, the folded airbag further comprising, when folded, a plurality of circumferential layers each comprising at least one of said main fold lines an extremity forming a closed line around the imaginary center.

18. The folded airbag according to claim 17 wherein the plurality of circumferential layers each comprises another said main fold line at an opposite extremity, opposite from the first named extremity, forming a closed line around the imaginary center.

* * * * *